United States Patent [19]
Snyder

[11] 4,232,910
[45] Nov. 11, 1980

[54] SYSTEMS AND METHODS FOR CONTROLLING TRAILER BRAKES AS A FUNCTION OF TRAILER WHEEL ROTATION

[75] Inventor: Robert C. Snyder, Country Club Hills, Ill.

[73] Assignee: Motor Wheel Corporation, Lansing, Mich.

[21] Appl. No.: 676,010

[22] Filed: Apr. 12, 1976

Related U.S. Application Data

[63] Continuation-in-part of Ser. No. 472,644, May 23, 1974, abandoned.

[51] Int. Cl.² ............................................. B60T 8/10
[52] U.S. Cl. ................................. 303/96; 188/181 C; 303/7; 303/20
[58] Field of Search ........... 180/82 R, 82 B, 103–105, 180/275, 282, 179; 188/181 C, 3 R, 112 A; 244/111; 303/7, 20, 93, 96; 317/5; 324/161; 340/53, 62; 361/238, 242

[56] References Cited

U.S. PATENT DOCUMENTS

| | | | |
|---|---|---|---|
| 2,206,656 | 7/1940 | Boldt | 303/7 |
| 2,277,035 | 3/1942 | Cannetta et al. | 303/96 |
| 3,022,114 | 2/1962 | Sampietro | 303/96 |
| 3,260,555 | 7/1966 | Packer | 303/96 |
| 3,398,994 | 8/1968 | Smith | 303/104 |
| 3,400,776 | 9/1968 | Smith | 303/96 X |
| 3,450,444 | 6/1969 | Ballard | 303/20 X |
| 3,482,887 | 12/1969 | Sheppard | 303/106 |
| 3,498,682 | 3/1970 | Mueller et al. | 303/109 |
| 3,511,542 | 5/1970 | Fielek, Jr. | 303/97 |
| 3,597,011 | 8/1971 | Clifford | 303/97 |
| 3,756,663 | 9/1973 | Fink et al. | 303/20 X |
| 3,758,165 | 9/1973 | Savelli | 303/20 |
| 3,764,182 | 10/1973 | Andreyko et al. | 303/96 |
| 3,767,270 | 10/1973 | Urban | 303/20 X |
| 3,778,118 | 12/1973 | Podlewski et al. | 303/96 |
| 3,810,521 | 5/1974 | Sparr | 180/103 |
| 3,819,234 | 6/1974 | Couchois et al. | 303/20 |
| 3,870,376 | 3/1975 | Riordan | 303/20 X |

Primary Examiner—Stephen G. Kunin
Attorney, Agent, or Firm—Barnes, Kisselle, Raisch & Choate

[57] ABSTRACT

Brake control systems and methods particularly suited for small trailers and the like wherein the angular velocity of each wheel in a selected pair of wheels is sensed and compared against each other to develop a control signal representing the differential in angular velocity between the respective paired wheels. In a skid control embodiment, while the brakes are being applied by the operator, the system automatically releases the brakes at both wheels in proportion to a velocity differential between the wheels indicating an impending skid. In the case of a trailer equipped with a sway control embodiment, the system automatically applies the brakes at both wheels in proportion to the wheel velocity differential representing excessive trailer sway. The respective skid control and sway control embodiments are useful alone or in a combined system. In a further modification, deceleration of the tractor-trailer unit when the tractor brakes are applied causes automatic trailer brake application proportional to trailer deceleration.

86 Claims, 21 Drawing Figures

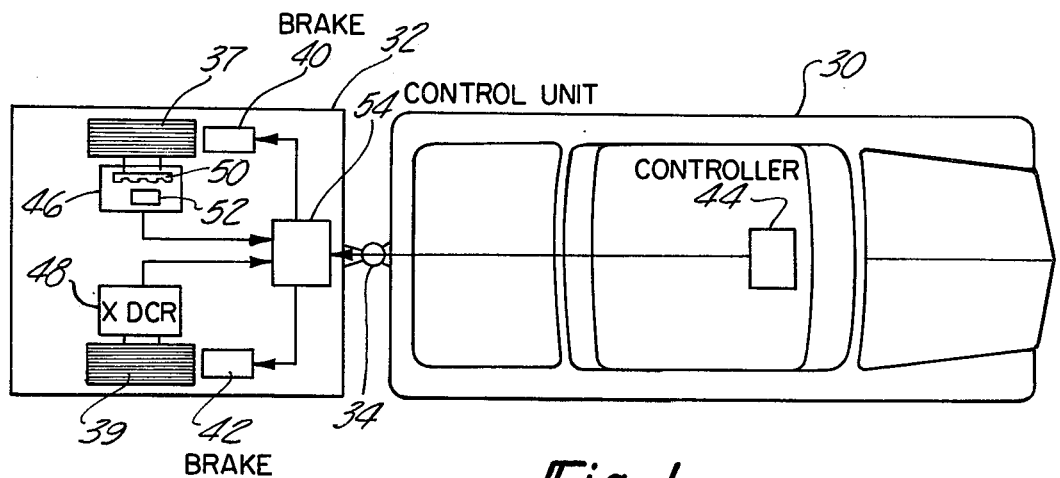
_Fig-1_
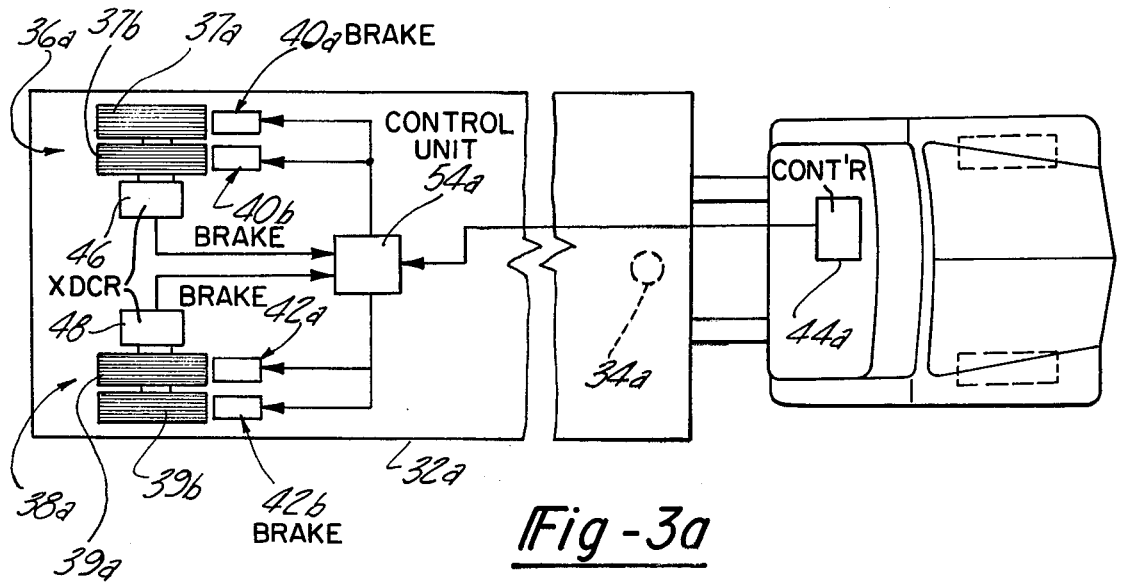
_Fig-3a_
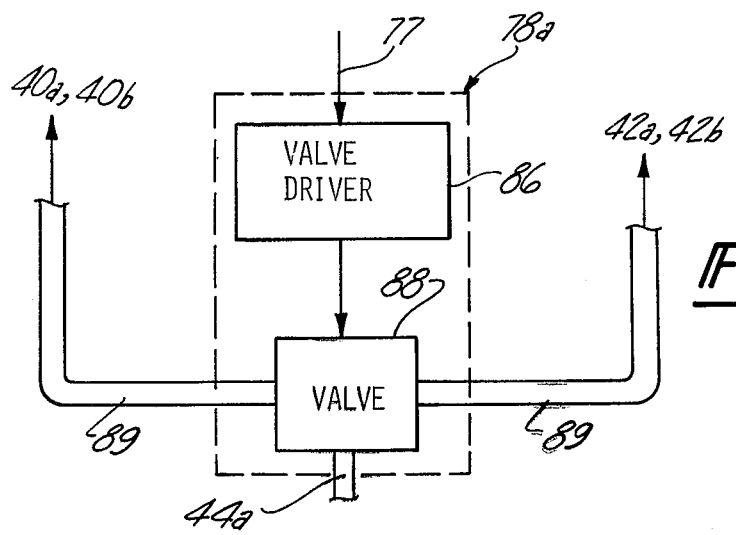
_Fig-3b_

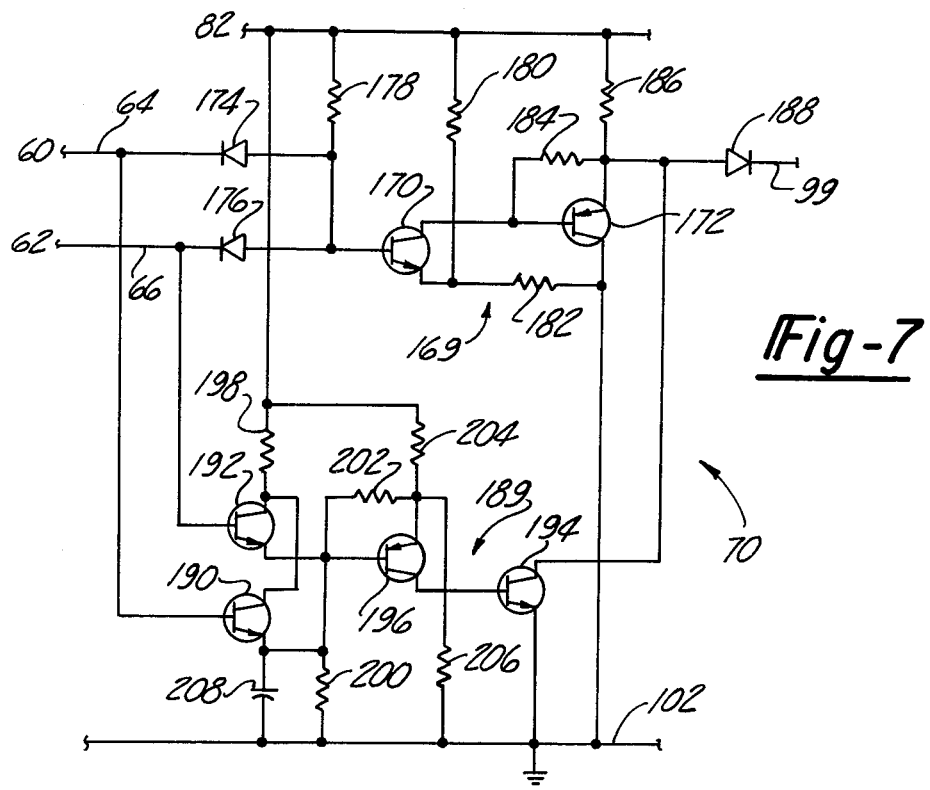
*Fig-7*
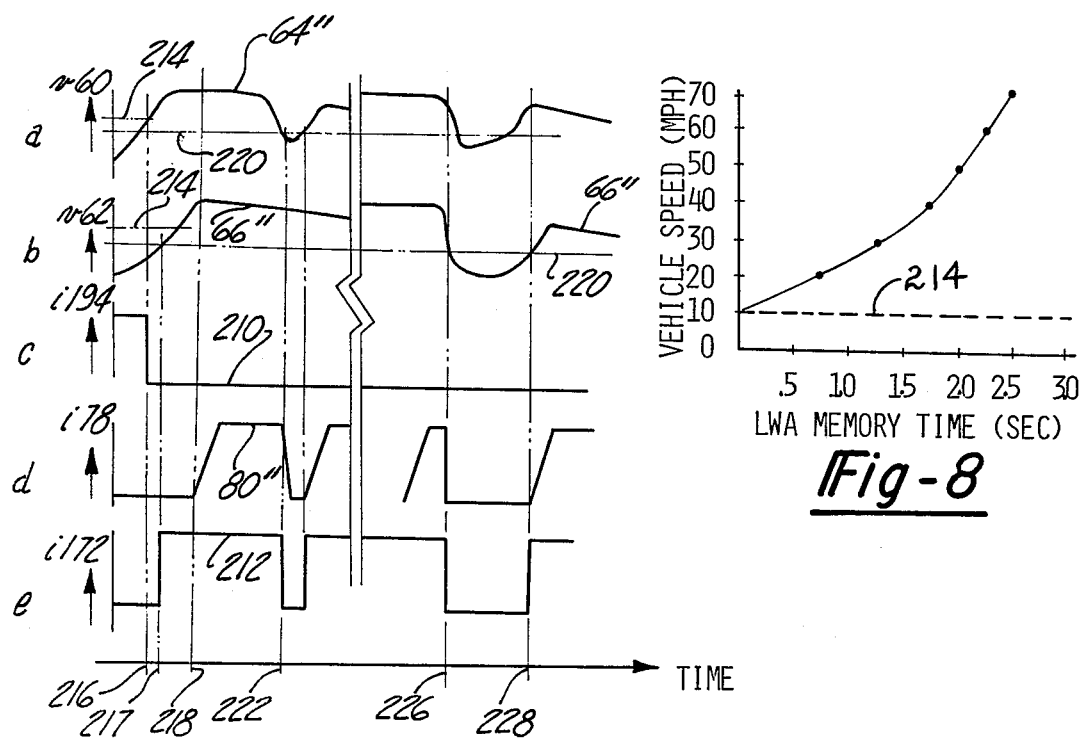
*Fig-8*
*Fig-9*

SYSTEMS AND METHODS FOR CONTROLLING TRAILER BRAKES AS A FUNCTION OF TRAILER WHEEL ROTATION

This application is a continuation-in-part of application Ser. No. 472,644, filed May 23, 1974, and now abandoned.

This invention relates to brake control systems and methods of the type in which brake torque to at least one wheel of a pair of wheels is regulated as a function of wheel rotation, preferably as a function of the difference in wheel speeds between the two wheels. More particularly, this invention relates to antiskid, antisway and automatic brake control systems for trailers, either alone or combined, wherein the trailer wheel brakes are controlled automatically according to trailer wheel rotation, preferably according to difference in wheel speeds in the case of skid and sway systems and combined skid and sway systems.

During braking, a vehicle may skid when one wheel of the vehicle contacts a surface, such as ice or gravel, having a coefficient of friction different from that of the surface contacted by the remaining vehicle wheels. A low coefficient wheel or wheels will lose angular velocity and hence slip with respect to the vehicle velocity at a rate greater than that of the high coefficient wheels for a given braking force or brake torque. It is known that maximum braking efficiency is obtained when each wheel slips at the rate of between 15 and 20 percent as compared to the forward velocity of the vehicle. In general, the prior art based on this principle includes skid control systems in which the angular velocity or the deceleration of each wheel is compared to the actual velocity or the actual deceleration of the vehicle or to an artificial standard to obtain a measurement of the degree of wheel slip. A given wheel brake is usually released completely when the slip at the wheel becomes excessive. This causes the entire brake drag force of the moving vehicle to be assumed by the remaining braked wheel or wheels such that the distribution of drag force about the center of the vehicle is uneven. Such an uneven force distribution results in erratic vehicle motion. Furthermore, those systems which require computation of vehicle velocity or deceleration often incorporate mechanical decelerometers, such as mercury pools or the like, and are, therefore, cumbersome and unreliable. If reliability is improved, the system is too complex and too expensive for many commercial applications such as camping trailers, travel trailers, boat trailers or the like.

Another disadvantage with proposed skid control systems arise because the brakes are completely released or "dumped" upon detection of the skid or an impending skid. When the slipping wheel spins back up to the desired velocity, the brake is again applied. This alternate release and application of the brake is inefficient and, in the case of a trailer, may cause erratic motion of the trailer or the tractor and undesirable stresses, for example, at the hitch and at the brake anchor pin. Skid control is particularly important with trailers to prevent jackknifing and unpredictable reactions at the towing vehicle causing the operator to panic when the trailer skids or jackknifes. With the recent increase in popularity of camping trailers and the like operated by relatively unskilled drivers, together with a renewed emphasis on highway safety, there is a significant need for effective yet inexpensive automatic skid control systems for small trailers.

Another problem with trailers is commonly known as trailer sway. When a tractor-trailer combination is subjected to lateral forces during normal highway driving, the hitch becomes a convenient hinge or pivot point for lateral trailer sway. Gusts caused by wind or by normal side-to-side vehicular manuevering and passing may cause the trailer to pivot at the hitch and, therefore, transcribe a periodic, substantially sinusoidal path along the direction of travel. Overreaction by an unskilled driver generally magnifies this lateral swaying motion. If unchecked, this sway will be transferred to the towing vehicle. As the sway is amplified, the operator may lose control of the towing vehicle. Again as in the case of skid control systems, the systems proposed for correcting trailer sway are either not effective or, in special circumstances, worse than no control at all. Furthermore, the proposed sway control systems, particularly those involving mechanical actuators, are not reliable.

A further deficiency in the prior art is that solutions to the problems of sway and skid have been approached separately without particular attention to compatibility of, or part interchangeability between, the two systems. This approach completely overlooks very important cost savings that can be realized by a combined antiskid-antisway system or, in the case of individual systems, by part interchangeability. Low manufacturing cost, as well as low installation, service and replacement part costs, are most important in the small trailer market. In this regard, brake control systems for antiskid have been designed for applications such as aircraft, large semi-trailer trucks and automobiles where, as compared to small trailers, higher costs can be tolerated.

Prior art systems for normally applying trailer brakes to slow or stop the tractor-trailer combination, commonly and hereinafter called trailer brake controllers, are generally responsive to direct control by the tractor operator. The controller disclosed in U.S. Pat. No. 3,371,253 (Hubbard), for example, includes a pivotable operator arm or handle by means of which the tractor operator has direct control of current to the trailer brakes. The controller disclosed in the U.S. Pat. No. 3,503,652 (VandenBroek) includes, in addition to an operator handle, a transducer and appropriate electronic circuitry to apply trailer brake pressure as a function of operator pressure on the tractor brake pedal. In controllers of the Hubbard type, the operator is required to perform two simultaneous functions to brake both the tractor and the trailer, while the VandenBroek type of controller requires connection into the tractor brake system and is dependent, at least in part, on the operability of the tractor brake system. An independent trailer braking system would be highly desirable, not only from the reliability standpoint but to avoid modification of or tying into the factory-installed tractor brake system.

Finally, many small trailers are equipped with electric brakes which, in retrospect, are especially suited to automatic control by electronic systems. Although many antiskid and antisway systems designed for hydraulic brakes or for pneumatic brakes could be adapted for electric brakes, important cost and performance advantages can be obtained by originally designing the system for electric brakes.

In general, the objects of the present invention are to provide automatic brake control systems and methods that overcome or at least substantially reduce the aforementioned disadvantages of prior art systems; that are relatively simple and inexpensive compared to less effective prior art arrangements; and/or that are particularly adapted for use with small trailers, even more particularly small trailers having electric brakes, but on the other hand are usable for automotive and large tractor-trailer applications with only minor modifications.

It is a further object of the present invention to provide a brake control system and method for trailers in which trailer brakes are applied, released or otherwise regulated at paired trailer wheels as a function of wheel rotation of at least one trailer wheel.

More specifically, it is an object of the present invention to provide a skid control system and method in which the braking forces at a pair of wheels are regulated as a function of an angular velocity differential between a pair of monitored wheels in such a way as to provide effective correction of an impending skid.

Another object of the present invention is to provide a skid control system and method in which the braking forces at a pair of wheels are regulated as a function of the above-mentioned velocity differential in a manner proportional to the degree of wheel slip to thereby obtain smoother, more efficient skid correction over a practical range of vehicle speeds and under a wide variety of varying road conditions as compared to conventional intermittent operation of the brake during skid correction.

Yet another object of the present invention is to provide a sway control system and method for trailers in which trailer sway correction is automatic and not subject to the overreaction of inexperienced drivers.

A further object of the present invention is to provide a sway control system for trailers in which the trailer brakes are applied at paired wheels as a function of the angular velocity differentials between the wheels to effectively sense an impending sway condition and correct it before it becomes excessive.

A still further object of the present invention is to provide a sway control system and method for trailers which regulates the brakes at the trailer wheels in a manner proportional to a wheel speed differential between the wheels to thereby provide a smooth, efficient and effective retarding force on the trailer and realign it with the towing vehicle.

Yet a further object of the present invention is to provide separate skid and sway control systems and methods that are compatible with each other; that use interchangeable parts and hence reduce manufacturing, installation, service and replacement parts costs; and/or that are particularly adapted for integration with each other into a combined system for correcting both trailer skid and trailer sway in a simple, effective, efficient and inexpensive manner.

A still further object of the present invention is to provide a combined skid and sway control system and method for trailers that is relatively low in cost yet effective and efficient, that correctly interprets a wheel speed differential as being indicative of either a skid or a sway condition, that operates effectively under a wide variety of road conditions and over practical speed ranges to correct for either skid or sway conditions at the trailer and/or that is particularly effective for trailers equipped with electric brakes yet readily adapted for trailers having hydraulic or pneumatic brakes with only minor modifications.

Yet another object of the invention is to provide a trailer brake control method and apparatus which are independent of direct tractor operator control.

More specifically, it is an object of the present invention to provide an automatic trailer brake control system and method which applies trailer brakes as a function of sensed trailer wheel rotation.

The novel features which are considered characteristic of the present invention are set forth in particular in the appended claims. The invention itself, however, together with additional objects, features and advantages thereof, will be best understood from the following description when read in connection with the accompanying drawings in which:

FIG. 1 is a top view schematically showing a car towing a trailer equipped with electric brakes and an automatic brake control system of the present invention;

FIG. 3a is a top view of a tractor and trailer having hydraulic or pneumatic brakes and equipped with a modified brake control system of the present invention;

FIG. 3b is a block diagram of a modification to the skid control system of FIG. 2 for use with hydraulic or pneumatic brakes;

FIG. 7 is a schematic diagram of a locked wheel arming and detection circuit of the skid control of FIG. 2;

FIG. 8 is a graph useful in understanding the operation of the locked wheel circuit of FIG. 7;

FIG. 9 is a timing diagram useful in understanding the operation of the locked wheel circuit of FIG. 7;

Figure 10:
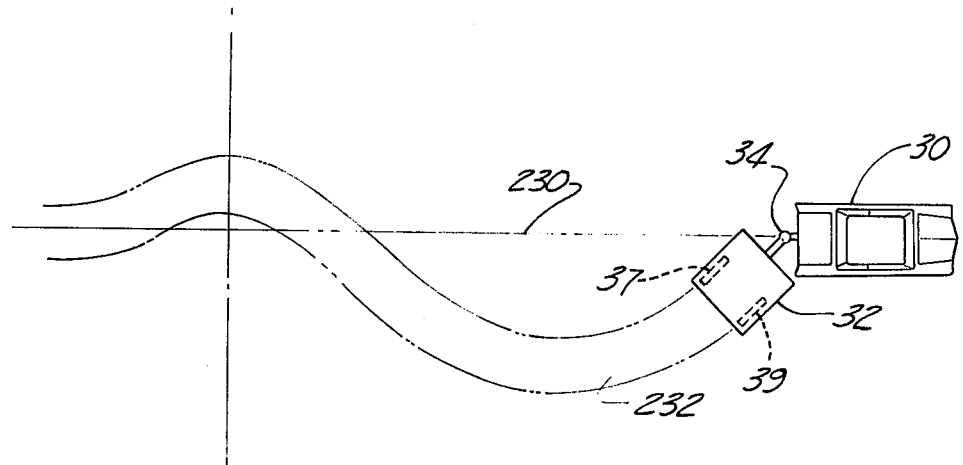
Figure 11:
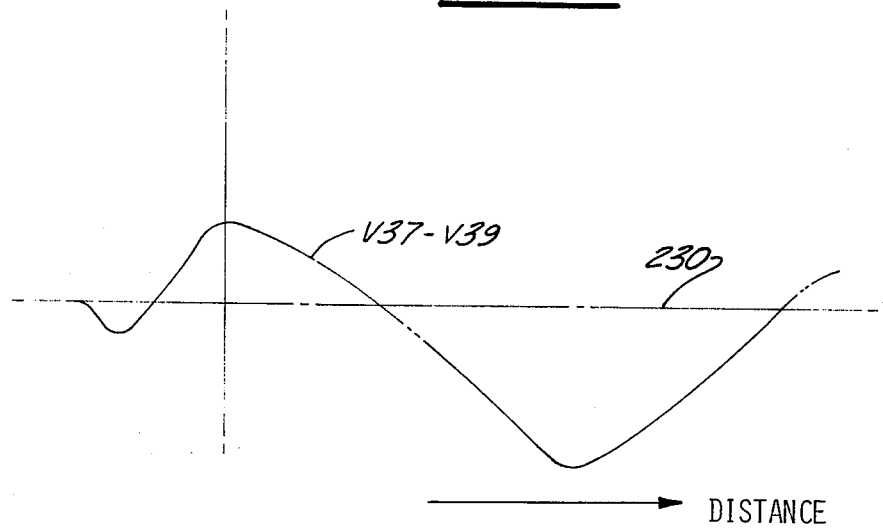
Figure 12:
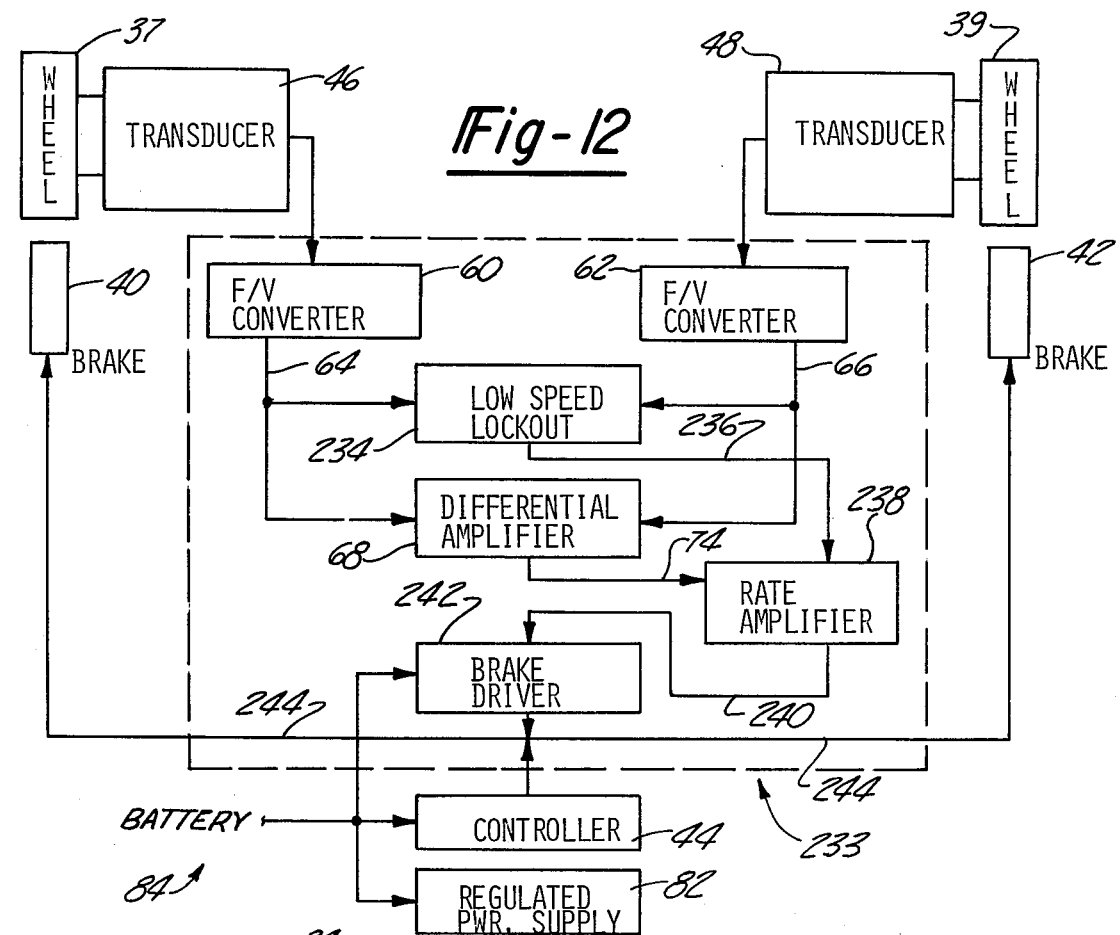
Figure 13:
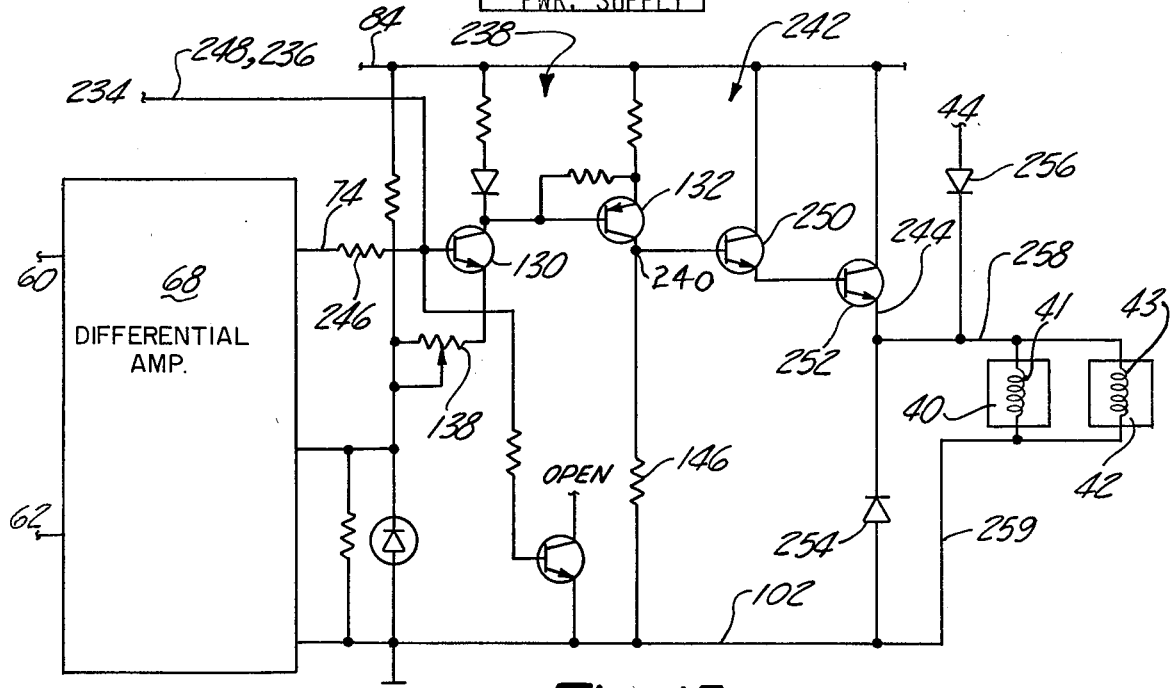
Figure 14:
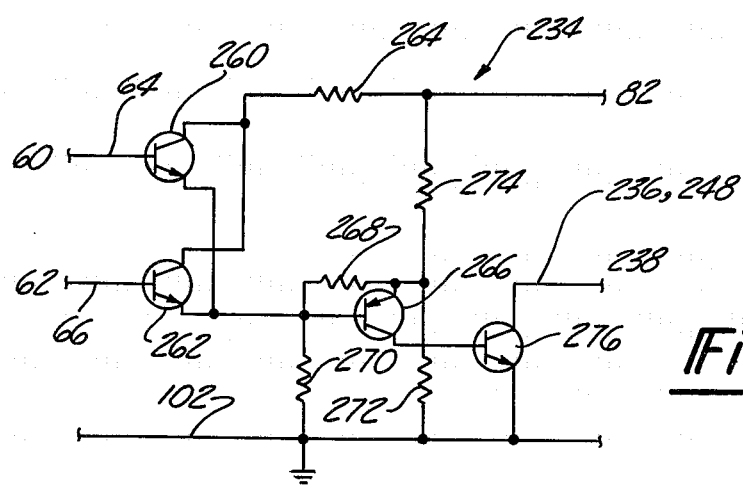
Figure 15:
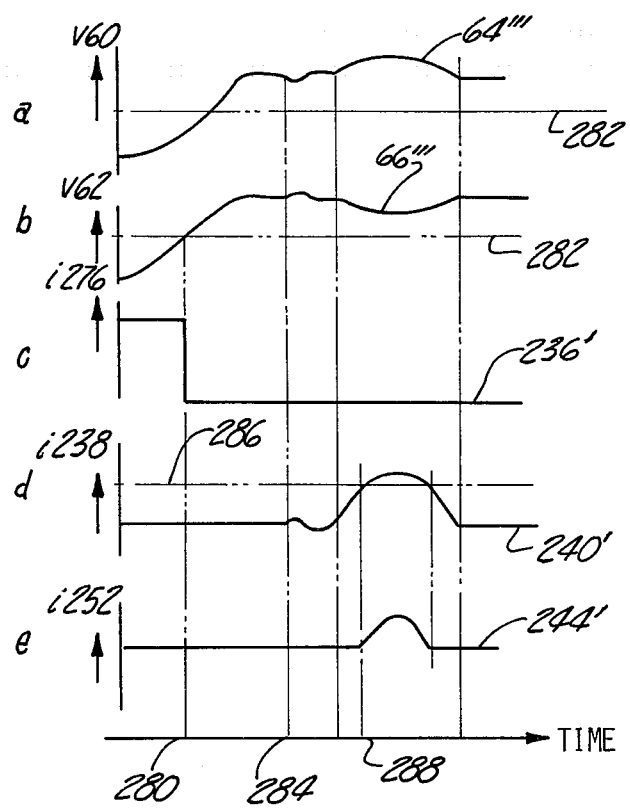
Figure 16:
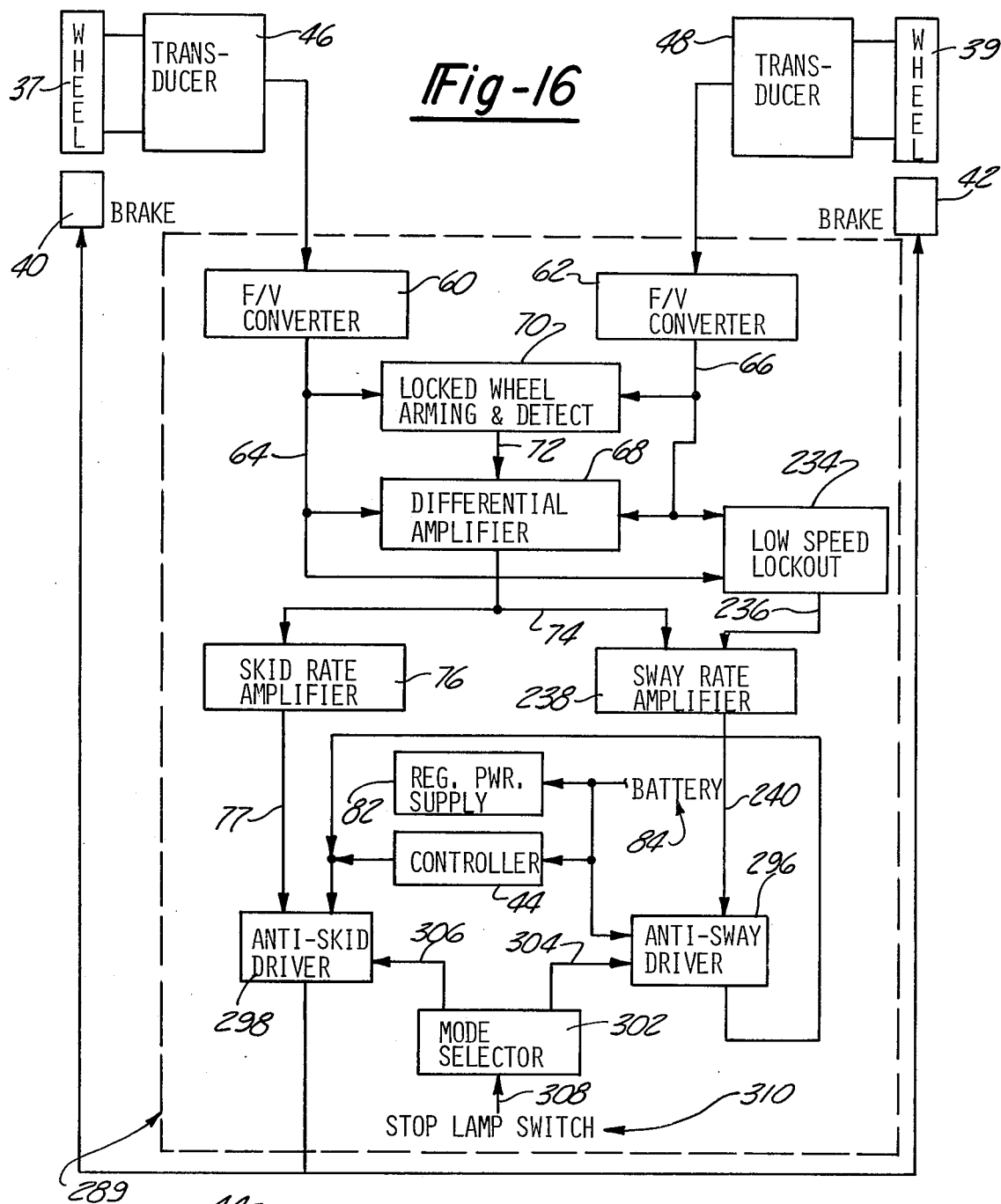
Figure 17:
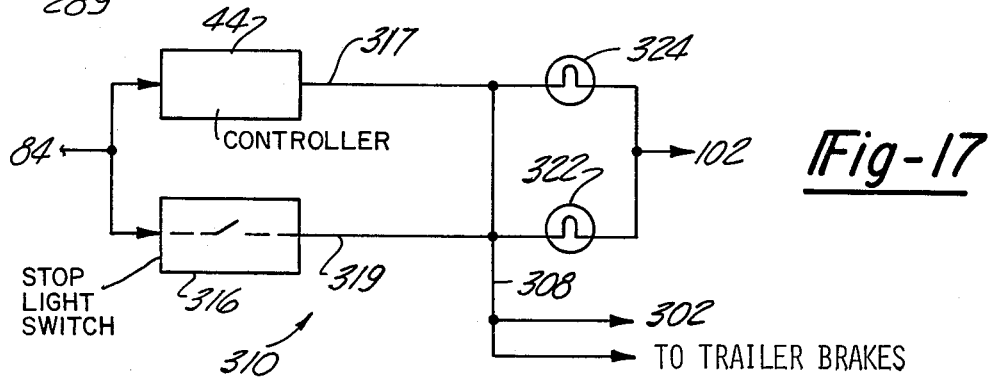
Figure 18:
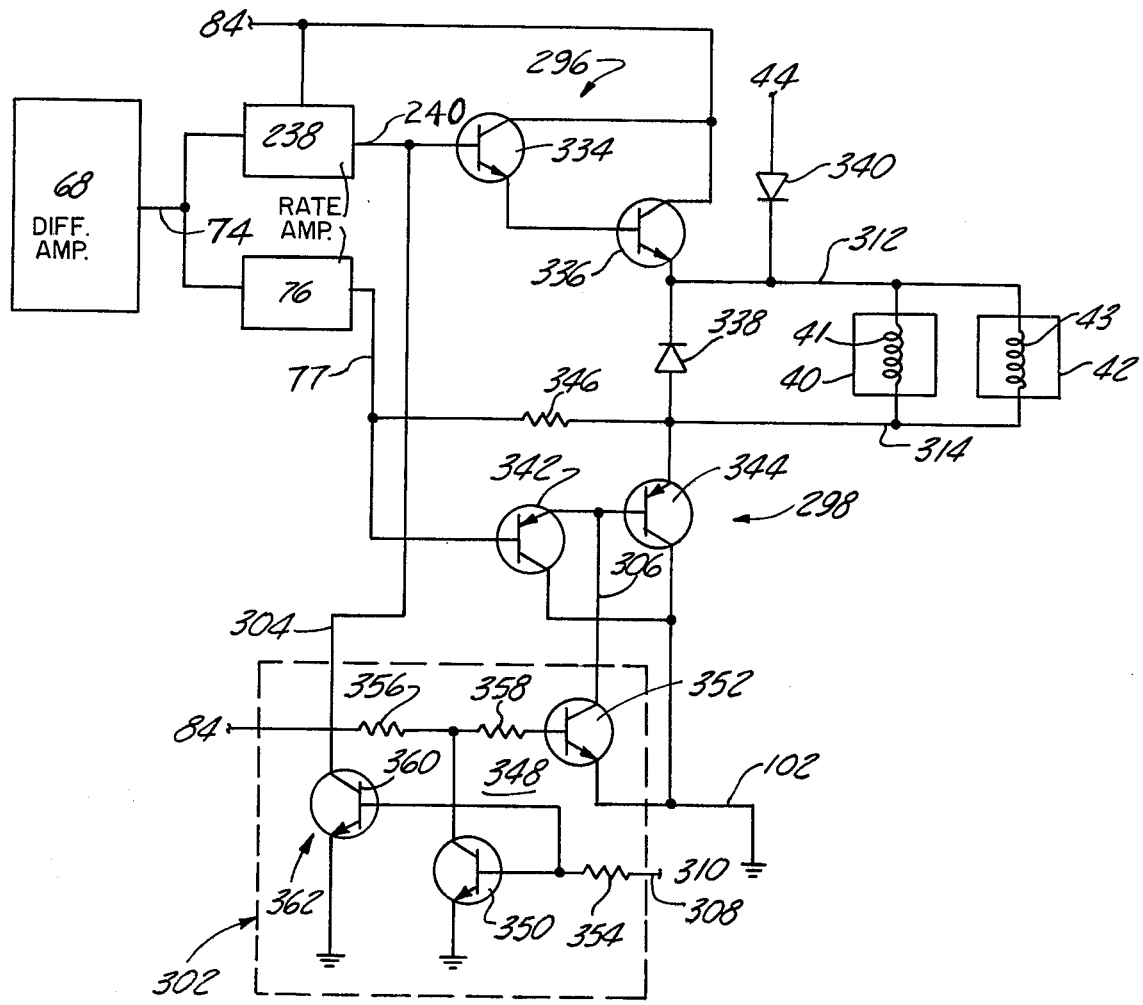
Figure 20:
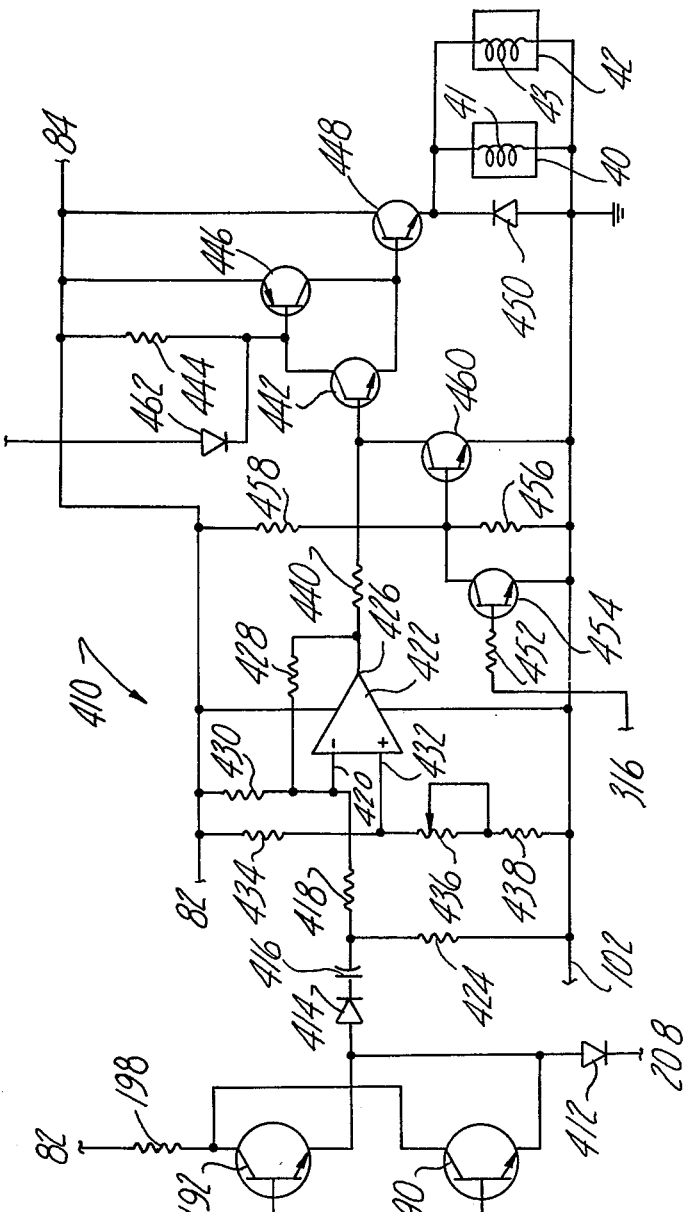
Figure 19:
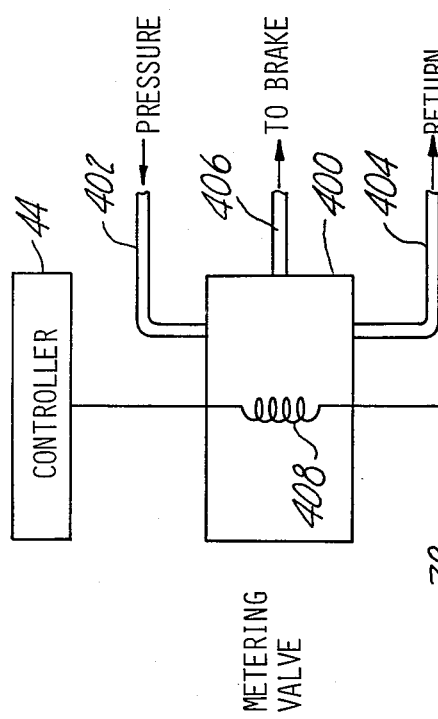

FIG. 10 schematically illustrates the motion of a trailer in a sway condition;

FIG. 11 is a graph of the angular velocity differential between the wheels of the trailer in the sway condition shown in FIG. 10;

FIG. 12 is a block diagram of a sway control system of the present invention;

FIG. 13 is a schematic diagram of a rate amplifier and a brake driver in the block diagram of FIG. 12;

FIG. 14 is a schematic diagram of a low speed lockout circuit in the block diagram of FIG. 12;

FIG. 15 is a timing diagram useful in understanding the operation of the sway control of FIGS. 12—14;

FIG. 16 is a block diagram of a combined skid and sway control system according to another aspect of the present invention;

FIG. 17 is a schematic diagram of a stop lamp controller that supplies an instruction signal to a mode selector in the block diagram of FIG. 16;

FIG. 18 is a schematic diagram which features selected circuits of the block diagram of FIG. 16;

FIG. 19 is a block diagram of an electrohydraulic brake system equipped with a skid control system in accordance with the invention; and FIG. 20 is a schematic diagram of an automatic brake controller in accordance with the invention.

Before proceeding with a detailed description of the drawings, it should be noted that the present invention as applied to skid and sway correction contemplates three generally distinct embodiments; namely, a skid control system, a sway control system, and a combined skid and sway control system. In each of the three embodiments, the condition to be corrected is detected from a difference in angular velocity between two wheels in a selected pair of wheels. This differential signal is then processed to release the brakes in the case of an impending skid, or apply the brakes in the case of a sway condition. Preferably, in both situations the brakes are controlled in a manner linearly proportional to the wheel speed differential. Although the end result of either applying or releasing the brakes in the respective skid and sway controls is different, the various embodiments have many operating features and circuit elements in common; and hence like reference numerals are used to indicate like elements in the drawings. Further in the drawings, a reference numeral applied to a connection between elements of a block diagram identifies the output or output signal appearing on the connection or, in the case of a circuit diagram, the output or output signal on the corresponding referenced line or conductor. The signals depicted in the various time diagrams are referenced by prime numerals which correspond directly to the base reference numeral in the block or circuit diagram being described. A reference numeral adjacent an open connection indicates that the connection is to be made to an element having that reference numeral in another figure.

OVERALL ARRANGEMENT

Referring to FIG. 1, a towing vehicle or tractor 30 is connected to a towed vehicle or trailer 32, such as a small camper or travel trailer, by means of a standard ball-and-socket hitch 34. Trailer 32 has a single axle (not shown) on opposite ends of which are mounted respective tired wheels 37, 39 arranged to be braked by means of respective electric brake units 40, 42. The brake units are of conventional construction wherein energizing current is supplied to a brake coil by a controller 44 actuated by the operator of vehicle 30; for example, a brake controller of the type disclosed in U.S. Pat. Nos. 3,371,253 and 3,503,652. Associated with each wheel 37, 39 is a respective transducer 46, 48, each of which includes a toothed wheel 50 and a magnetic pickup unit 52. The toothed wheels 50 are mounted for corotation with their associated tired wheels 37, 39 so that each pickup unit 52 generates a respective sinusoidal output signal having a frequency proportional to the angular velocity of the associated wheels 37, 39. The two velocity signals from transducers 46, 48 are fed to a brake control unit 54 which in turn controls the brakes 40, 42.

The overall arrangement described thusfar is equally applicable to the three principal embodiments of the present invention; namely, a skid control system, a sway control system, and a combined skid and sway system. The principal difference in the three systems is in the construction and operation of the control unit 54. As will later be described in greater detail, in a skid control system, assuming that the operator has actuated the electric brakes 40, 42, the two wheel velocity signals are compared by control unit 54 and the resultant differential signal is used to release the brakes 40, 42 in linear proportion to the differential signal. In the antisway embodiment, the two wheel velocity signals are again compared by the unit 54 but the resultant differential signal is used to apply brakes 40, 42 in direct linear proportion to the differential signal to provide a retarding force on the trailer 32. In the combined system, the two wheel velocity signals are also compared and the resultant differential signal is used to either release or apply brakes 40, 42, depending on whether the system has interpreted the condition as being a skid or a sway, as the case may be.

SKID CONTROL SYSTEM

Figure 2:
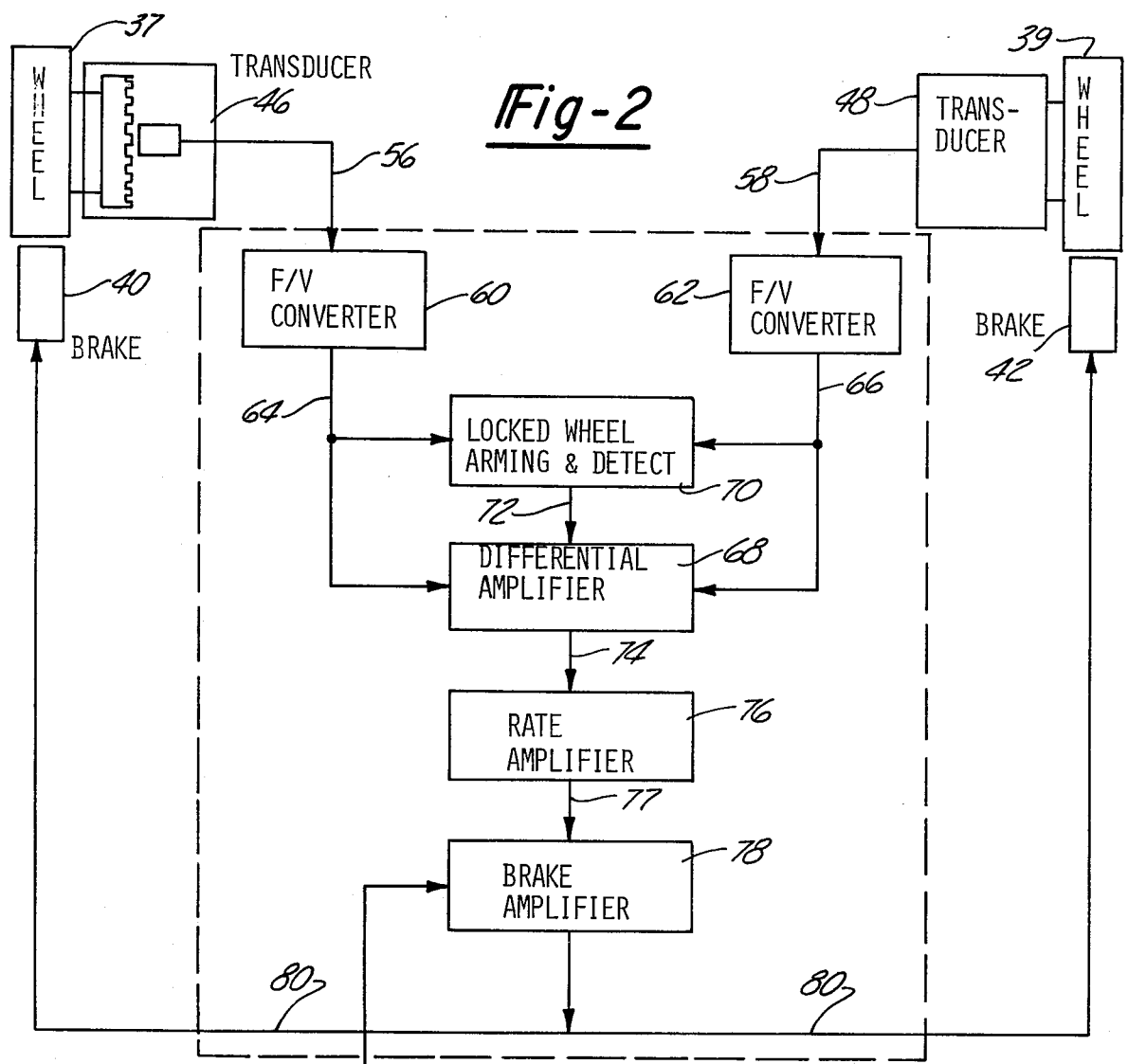
FIG. 2 is a block diagram of a skid control system on the trailer of FIG. 1.

Referring now to FIG. 2, the skid control unit 55 (brake control unit 54, FIG. 1) comprises a pair of frequency-to-voltage converters 60, 62 that receive the respective outputs 56, 58 from the transducers 46, 48. Converters 60, 62 develop DC outputs 64, 66, respectively, which are linearly proportional to the frequency of outputs 56, 58, respectively. Converter outputs 64, 66 are fed to a differential amplifier 68 and to a locked wheel arming and detection circuit 70 which in turn has an output 72 connected to a separate input of amplifier 68. Amplifier 68 compares outputs 64, 66 to provide a differential output signal 74 that represents the absolute value of the difference between converter outputs 64, 66. Output 74 is fed to a rate amplifier 76 whose output 77 is in turn fed to a brake divider and amplifier 78. Brake current is fed from a battery 84 in vehicle 30 via controller 44 and amplifier 78 to wheel brakes 40, 42. When the brakes are being applied by the operator, amplifier 78 regulates the braking current supplied to brake units 40, 42 as a function of differential output 77 to prevent an impending skid. If wheels 37, 39 both skid, then the locked wheel circuit 70 causes amplifier 78 to fully release both brake units 40, 42. A regulated power supply 82 provides the regulated DC voltage required by unit 55.

In the preferred embodiment of the skid control, brake amplifier 78 simultaneously reduces the current to both brake units 40, 42, thereby releasing brake torque at both wheels 37, 39 substantially equally, in proportion to differential output 74 and at a rate set by amplifier 76. It is further preferred that the rate supplied by amplifier 76 be substantially linear over the range of differential output 74 normally encountered. The present invention insures that the slip rate does not exceed the optimum rate of approximately 15 to 20 percent and that the maximum braking force is developed consistent with the lowest surface friction coefficient availalbe. Since the brakes 40, 42 at both wheels are regulated simultaneously, an impending skid condition will be corrected regardless of which of the two wheels 38, 39 is about to skid. Although simultaneous reduction of brake torque at both brakes may appear to result in some loss of total braking at the trailer 30, since only one wheel may be about to skid, this seeming disadvantage is far outweighted by the simplicity of the skid control system and the more effective lateral control of the vehicle system that is achieved.

Before describing the circuit details of the skid control unit of FIG. 2, it should be appreciated that the overall system described in connection with FIGS. 1 and 2 is equally applicable, with slight modification, to a trailer-tractor combination of the type shown in FIG. 3a and equipped with either pneumatic or hydraulic brakes. Trailer 32a is equipped with a pair of wheel units 36a, 38a each comprising a pair of tandem wheels 37a, 37b and 39a, 39b disposed at opposite ends of the axle (not shown). Wheel units 36a, 38a are operatively connected to transducers 46, 48, respectively, such that the outputs of transducers 46, 48 vary as a function of the wheel rotation or angular velocity of at least one wheel of each of the pair of wheel units. The braking forces applied by the operator-responsive source of fluid pressure, controller 44a, to the hydraulic (or pneumatic) brake units 40a, 40b and 42a, 42b are regulated by brake control unit 54a in a manner similar to that to be described in connection with FIGS. 1 and 2.

For the skid control embodiment being described, the control unit 54a in FIG. 3a is identical to skid unit 55 (FIG. 2) except that amplifier 78 (FIG. 2) is replaced with a brake amplifier 78a (FIG. 3b) comprising a valve driver 86 and a hydraulic (or pneumatic) valve 88 connected to brake units 40a, 42a by means of the conduits 89 and to a source of operator-controlled fluid pressure 44a. To achieve the preferred proportional control mentioned above with respect to FIG. 2, valve 88 is a proportioning valve of the type which regulates brake pressure in conduits 89 in proportion to the input 77 to valve driver 86 from rate amplifier 76 (FIG. 2). It is to be understood that although the brake control systems of the present invention will be described primarily in connection with electric brakes, the systems may be readily adapted for use in vehicles equipped with pneumatic or hydraulic brakes according to the minor modification of FIGS. 3a and 3b.

Figure 4:
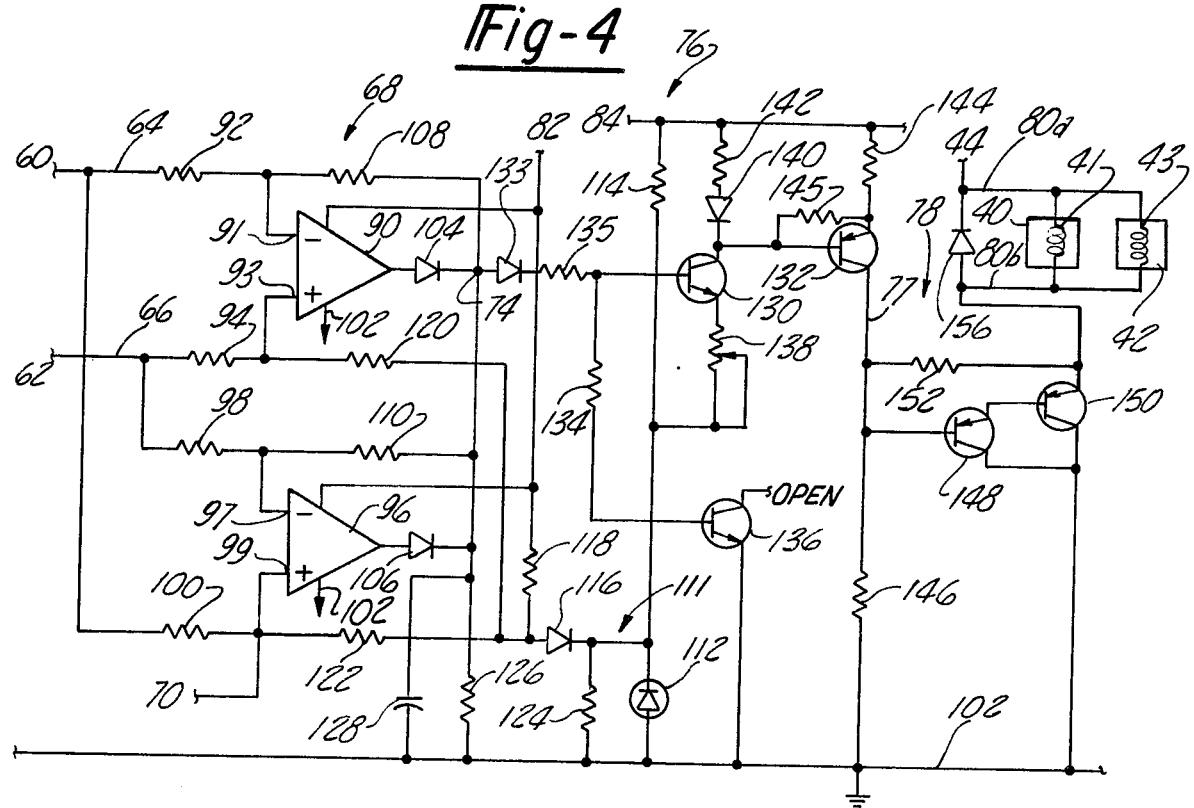
FIG. 4 is a schematic diagram of a differential amplifier, a rate amplifier and a brake driver amplifier in the skid control of FIG. 2.

Referring to FIG. 4 and the circuit details of FIG. 2, amplifier 68 has a first differential amplifier 90 receiving its negative input 91 through a resistor 92 from converter 60 and receiving its positive input 93 through a resistor 94 from converter 62. A second differential amplifier 96 receives its negative input 97 from converter 62 and its positive input 99 from converter 60 through the resistors 98, 100, respectively. Power is supplied to amplifiers 90, 96 from regulated power supply 82 and amplifiers 90, 96 are referenced to a ground 102. The outputs of amplifiers 90, 96 are tied to the respective anodes of the diodes 104, 106, the cathodes of which are connected together to form output 74 of differential amplifier 68. Output 74 is also tied back to negative inputs 91, 97 of amplifiers 90, 96 through the usual feedback resistors 108, 110, respectively.

The inputs of amplifiers 90, 96 are biased above ground 102 to insure linear operation over the entire range of converter outputs 64, 66. This offset or biasing voltage level is provided by a biasing voltage network 111 comprising a Zener diode 112, resistor 114, a silicon diode 116 and a resistor 118. For example, with a battery voltage of 12 volts applied to diode 112 through resistor 114 and wherein diode 112 is a Zener diode having a 3.6 volt reverse breakdown voltage, the bias or offset voltage supplied by network 111 at the anode of diode 116 is 4.2 volts; i.e., the sum of the reverse voltage drop across diode 112 and the forward diode across diode 116. The inputs of amplifiers 90, 96 are made to "float" upon this bias or offset voltage by tying positive inputs 93, 99 of amplifiers 90, 96 to the anode of diode 116 through the resistors 120, 122, respectively. A resistor 124 connected across diode 112 insures nonregulated operation of network 111 if diode 112 fails. Output 74 is stabilized with respect to ground 102 by means of a resistor 126 and a capacitor 128. Amplifiers 90, 96 each have unity gain and are connected to exhibit opposite arithmetic signs so that output 74 comprises an offset voltage plus a differential signal which is the absolute value of the difference between converter outputs 64, 66.

Rate amplifier 76 generally comprises an NPN transistor 130 to amplify output 74 at a desired linear rate, and a PNP transistor 132 to shift the amplified differential signal from the offset voltage reference to a ground reference. Output 74 is connected through a diode 133 and a current limiting resistor 135 to the base of transistor 130 which is also connected to ground 102 through a resistor 134 in series with the base-emitter junction of an NPN compensating transistor 136. Diode 133 provides a dead band at the input of amplifier 76, the purpose of which will be explained hereinafter. Transistor 136 and resistor 134 stabilize output 74 and compensate for characteristic changes in the base-emitter junction of transistor 130 over an extended temperature range. The emitter of transistor 130 is connected through a resistor 138 to biasing network 111 at the cathode of diode 112, rather than at the anode of diode 116, to balance the circuit. Resistor 138 is adjustable so that the rate of amplification of slope amplifying transistor 130 may be adjustably set at a desired value. The setting of resistor 138 is intended primarily for factory adjustment for the particular trailer on which the unit is installed. For example, in one embodiment, with a twenty-foot, self-contained, two-wheeled travel trailer manufactured by Scamper Corp., weighing about 3500 pounds and having a hitch-to-axle distance adjusted to 12.8 feet, resistor 138 was adjusted so that a wheel speed differential of zero yielded maximum brake current and a differential of 13.5 m.p.h. resulted in substantially zero brake current. The value of 13.5 m.p.h. was determined emperically, based in part on optimum vehicle performance under varying dynamic conditions, such as tire diameter, suspension spring rates, weight and lateral overturning moment. The collector of transistor 130 is connected to battery 84 via diode 140 and an output resistor 142. The collector of transistor 130 is also connected to the base of transistor 132 whose emitter is connected to battery 84 through a resistor 144 and is bootstrapped to its base through a resistor 145 to assure that transistor 132 will turn off completely. The collector of transistor 132 is connected to ground 102 through an output resistor 146. The output 77 across resistor 146 is proportional to the absolute value of the difference between first and second converter outputs 64, 66, amplified at a rate determined by the setting of resistor 138, and referenced to ground 102.

Brake amplifier 78 comprises the PNP transistors 148, 150 connected as a Darlington pair to operate as an emitter-follower amplifier in series with brakes 40, 42 and controller 44 across battery 84. Resistor 152 is to prevent emitter-base leakage in transistors 150, 148 and to insure that both transistors shut off completely during periods of nonconduction. The emitter of transistor 150 is connected via conductor 80b to the puck energizing coils 41, 43 in brake units 40, 42 which are in turn connected to controller 44 via conductor 80a. A diode 156 connected across brakes 40, 42 is poled oppositely to transistor 150 to suppress inductive ringing at the brake coil load when transistor 150 is turned off.

Figure 5:
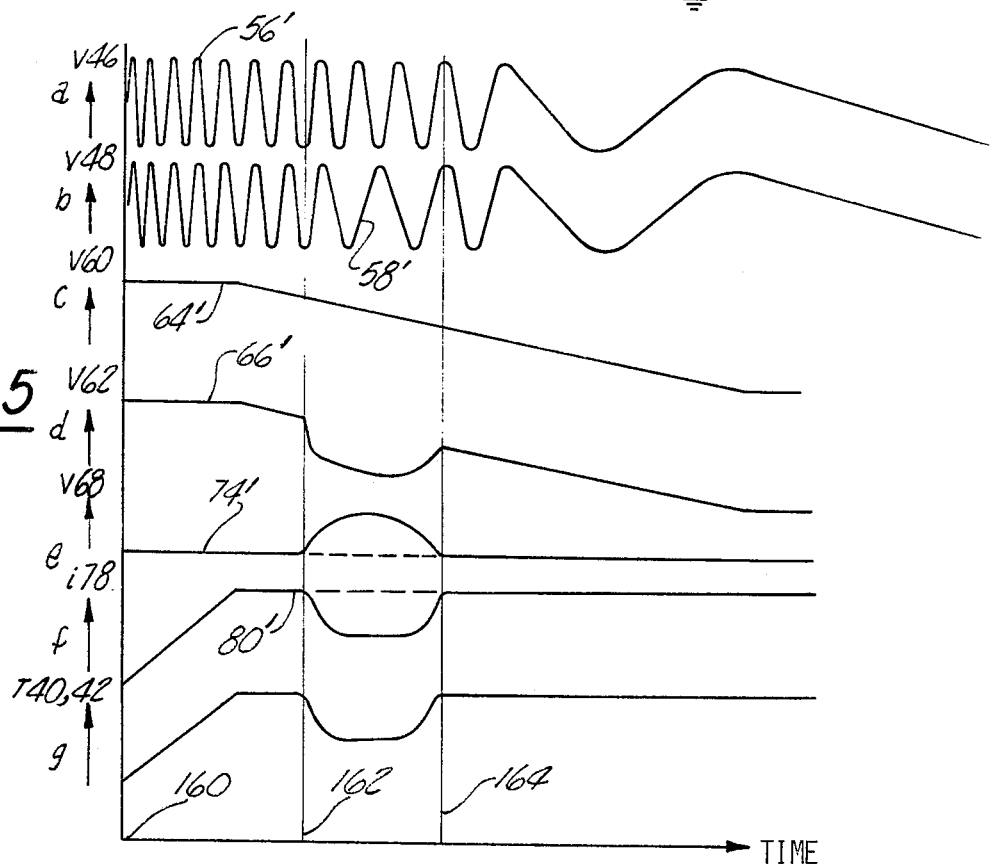
FIG. 5 is a timing diagram useful in understanding the operation of the skid control of FIGS. 2 and 4.

Neglecting the locked wheel circuit 70, operation of the skid control system shown in FIGS. 2 and 4 may be best understood with reference to the timing diagram of FIG. 5. Graph a of FIG. 5 depicts a signal 56' which corresponds to an assumed output 56 from transducer 46 for purposes of illustration. Similarly, signal 58' (graph b of FIG. 5) corresponds to output 58 from transducer 48; signals 64', 66' (graph c and d of FIG. 5) correspond to outputs 64, 66 from converters 60, 62, respectively; signal 74' (graph e of FIG. 5) corresponds to output 74 from differential amplifier 68; and signal 80' (graph f of FIG. 5) corresponds to output 80 from brake amplifier 78. The ordinates of graphs a–e in FIG. 5 are each measured in units of voltage ($v_{46}$, $v_{48}$, $v_{60}$, $v_{62}$, $v_{76}$) and are not necessarily to scale. In graph e, the dead band and offset voltages discussed above with respect to FIG. 4 have been eliminated for clarity of understanding. The ordinate of graph f is a measure of current ($i_{78}$). Graph g in FIG. 5 depicts the time history of the brake torque ($T_{40, 42}$) at wheels 37, 39 resulting from brake amplifier output signal 80' to brake units 40, 42. The abscissa of FIG. 5 is a measure of time and is common to graphs a–g.

During normal highway operation, wheels 37, 39 rotate at substantially the same angular velocity so that differential output signal 74' is equal to zero at a time 160 just before brake current is applied to the brake units. When differential signal 74' is equal to zero, output 74 from differential amplifier 68 will be equal to the offset voltage discussed above. The voltage appearing across resistor 146 of FIG. 4 will, therefore, be equal to zero so that transistors 148, 150 are fully conductive. At time 160 (FIG. 5), the operator of the towing vehicle activates operator responsive controller 44 to apply the brakes of the towed vehicle. Current from controller 44 flows to brake coils 41, 43 through conductor 80a, diode 156 being reverse biased, and returns to ground 102 through conductor 80b and fully conducting transistors 148, 150. The signals 56', 58' thus begin to decrease substantially equally and linearly in proportion to the applied brake current. At a time 162, wheel 39 contacts an area of the highway having a lower coefficient of friction than that area in contact with wheel 37 and it is assumed that wheel 39 begins to slip causing output signal 58' to decrease more rapidly than signal 56'. Thus signal 66' from converter 62 will decrease more rapidly than signal 64'; and as the velocity differential between wheels 37 and 39 increases, differential signal 74' developed by amplifier 68 increases correspondingly.

Because there is substantially zero voltage drop in the emitter-base junction of PNP transistors 148, 150, brake amplifier 78 is closely responsive to the differential signal 74' (above the dead band). Thus a small increase in differential signal 74' will decrease conduction of current through resistors 148, 150 and hence through the brake coils 41, 43. As stated above, it is preferred that this conduction decrease be linearly proportional to the differential signal.

Referring again to FIG. 5, it can be seen that brake current output signal 80' (graph f) will decrease in a manner proportional to the increased differential signal 74'. Likewise, the brake torque applied at both wheels 37, 39 (graph g in FIG. 5) will decrease in proportion to the decreased brake current signal 80', allowing wheel 39 to spin back up to the velocity of wheel 37. When these velocities are equal, as at a time 164, wheel velocity differential signal 74' will decrease to zero and brake current signal 80' is again at maximum. Thus the skid control system shown in FIGS. 2 and 4 releases brake torque at both wheels 37, 39 in linear proportion to the absolute value of the angular velocity differential between the wheels to correct for an impending skid. It will be understood that if a skid condition results when brake torque is reapplied, the control process will be repeated as required.

Figure 6:
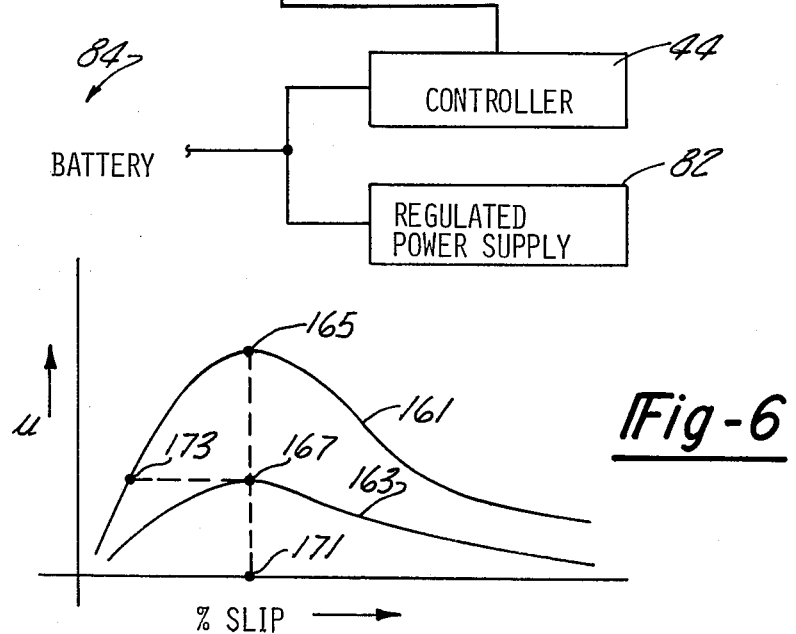
FIG. 6 is a graph which depicts a pair of superimposed $\mu$-slip curves and which is useful in understanding the operation of the skid control system of FIGS. 2 and 4.

The inherent advantage of the method of the disclosed skid control system over the systems previously proposed in the art will be readily apparent from a study of FIG. 6 which is a graph depicting a pair of superimposed $\mu$-slip curves. As indicated, the abscissa of FIG. 6 is in percent (%) slip and the ordinate, $\mu$, is a measure of the coefficient of rolling friction between a given wheel and the road surface.

Referring to FIGS. 1 and 6, curve 161 is the $\mu$-slip curve of wheel 37 and depicts the braking characteristics of wheel 37 on dry pavement. Curve 163 depicts the braking characteristics of wheel 39 on a surface having a coefficient of friction less than that of dry pavement, such as ice or gravel. It is assumed for purposes of explanation that curves 161, 163 have maximum points 165, 167, respectively, occurring at the same percent slip 171 between 15 and 20 percent. The same amount of brake current required at wheel 37 to operate at point 165 of curve 161 would cause braking at wheel 39 to shift toward the right as viewed in FIG. 6 beyond point 167 of curve 163 to an excessive slip rate at which wheel 39 will lock up. The skid control system of the present invention reduces the current to both wheels simultaneously so that the drag or braking force at both wheels is reduced to a maximum level consistent with the lowest coefficient available that will sustain that maximum drag force. Referring again to FIG. 6 where the maximum drag force available for wheel 39 corresponds to point 167, when the brake energizing current is reduced at both wheels according to the wheel speed differential, wheel 39 continues to operate at point 167 while brake operation at wheel 37 moves down on the $\mu$-slip curve 161 from point 165 to point 173. Thus an optimum braking force is maintained at both wheels 37, 39 consistent with the lowest coefficient available. Substantially the same braking force is developed at both wheels 37, 39 resulting in substantially equal drag at the respective wheels so that the motion of the trailer will be controlled in alignment with the towing vehicle. By contrast, with systems previously proposed that regulate the current to brakes 40, 42 of FIG. 1 independently so that wheels 37, 39 operate at points 165, 167, respectively, the resulting disparity in the drag forces at the respective wheels causes uncontrolled, erratic trailer motion.

Furthermore, the reason for providing the above-mentioned dead band in the skid control system of FIGS. 2 and 4 may be readily appreciated with reference to FIG. 6. Minor wheel speed differentials may be caused by reasons other than an impending skid of one wheel. Such minor variations may be caused by a difference in wheel diameters caused, due to wear or under inflation of one tire, by motion of the tractortrailer combination around a curve, as at a freeway interchange or by trailer sway. In such situations, minor wheel speed differentials are ignored due to the dead band; and hence the operator can apply the brakes without any automatic regulation by brake driver 78. The dead band is provided to take advantage of the maximum surface drag available during minor wheel speed differentials by maintaining brake operation of both wheels at or near the peak of the $\mu$-slip curve. In this way, brake current to the wheel pair will not be reduced until the braking operation of the wheel on the low coefficient surface (wheel 39 in FIG. 6) has moved substantially beyond point 167. It has been discovered, pursuant to the present invention, that to insure that trailer braking is not impaired on a freeway interchange, the velocity differential threshold of the skid control system, that is, the upper limit of the dead band, should be in the range of 10 to 15 percent at a trailer speed of 50 m.p.h. Diode 133 of FIG. 4 provides a 0.6 volt dead band at the input of amplifier 76 which is equivalent to a velocity differential dead band of 6 m.p.h. or 12 percent at a trailer speed of 50 m.p.h. It will be evident that the skid control system can operate without a dead band but will achieve a lesser braking efficiency.

Road surface conditions might exist under which the skid control system of FIGS. 2 and 4 will not correct the wheel velocity differential. Furthermore, if both monitored wheels are on a low coefficient area, both wheels may slip at the same rate so that there is no wheel velocity differential. Locked wheel arming and detection circuit 70 (FIGS. 2 and 7) will detect such conditions and completely release brake torque at both wheels 37, 39 to correct for the impending skid.

Referring to FIG. 7 and the locked wheel circuit 70, a detection circuit 169 comprising an NPN transistor 170 and a PNP transistor 172 detects that condition wherein either one or both of the converter outputs 64, 66 falls below a first minimum threshold signal, thereby indicating a lockup of one or both wheels. First and second converters 60, 62 are connected via diodes 174, 176, respectively, to the base of transistor 170 and to supply 82 through a pullup resistor 178. The emitter of transistor 170 is connected to power supply 82 through a resistor 180 and to ground 102 through a resistor 182. Resistors 180, 182 form a voltage divider network which, when connected to the emitter of transistor 170, determines the minimum threshold 220 (FIG. 9) at which transistor 170 will conduct. In the circuit disclosed, with outputs 64, 66 each rated at one tenth volt per m.p.h., the minimum detection threshold 220 (FIG. 9) as determined by transistors 170, 172 is 9 m.p.h. Although it may be theoretically desirable to have a lower threshold, the value of 9 m.p.h. achieves effective operation on the above-mentioned Scamper trailer. The collector of transistor 170 is connected to the base of transistor 172 and to the emitter of transistor 172 through a resistor 184 which insures that transistor 172 can be completely turned off. The emitter of transistor 172 is also connected to power supply 82 through an output resistor 186 and via an isolation diode 188 to the positive input terminal 99 of amplifier 96 (FIG. 4).

During periods of normal highway operation, the converter outputs 64, 66 will be sufficiently high to reverse bias diodes 174, 176 and insure conduction of transistors 170, 172 by means of pull-up resistor 178, thus holding the anode of diode 188 near ground. Diode 188 will thus be reverse biased so that operation of differential amplifier 68 will not be affected by locked wheel detection circuit 169. When either one or both of outputs 64, 66 drop below the threshold determined by voltage divider network 180, 182 so that the base-emitter junction of transistor 170 is reverse biased, transistors 170, 172 cease conduction, thereby placing the power supply voltage upon positive input terminal 99 of amplifier 96 of FIG. 2 through resistor 186 and diode 188.

To enable brakes 40, 42 to be applied when the vehicle is traveling less than the locked wheel detection threshold, there is an arming circuit 189 generally comprising the NPN transistors 190, 192, 194 and the PNP transistor 196. Arming circuit 189 senses a vehicle speed above a second or minimum arming threshold 214 (FIG. 9) and inhibits operation of the detection circuit 169 at vehicle speeds below this second threshold. Converters 60, 62 are connected to the bases of transistors 190, 192, respectively, the collectors of which are connected to power supply 82 through a resistor 198. The emitters of transistors 190, 192 are connected together at the base of transistor 196 and are connected to ground 102 through a resistor 200 and to the emitter of transistor 196 through a resistor 202. The emitter of transistor 196 is connected to power supply 82 through a resistor 204 and to ground 102 through a resistor 206. Thus resistors 204, 206 form a voltage divider network which determines the threshold at which transistor 196 will cease to conduct. The collector of transistor 196 is connected to the base of transistor 194. The emitter of transistor 194 is connected to ground 102, while the collector of transistor 194 is connected to the anode of diode 188. Transistors 190, 192 develop a voltage across resistor 200 at the base of transistor 196 which follows the faster moving wheel. When either output 64 or output 66 exceeds the arming threshold 214 (FIG. 9), transistor 194 will go from saturation to cutoff to unground diode 188 and thus enable or arm the detection circuit 169.

Arming circuit 189 also includes a memory comprising a capacitor 208 connected from the junction of the emitters of transistors 190, 192 to ground 102. The voltage on capacitor 208 "remembers" the vehicle speed, which is arbitrarily defined as the speed of the faster moving wheel, for some time after both converter outputs 64, 66 drop below the minimum arming threshold 214. The memory time of capacitor 208 is the time necessary for the charge on capacitor 208 to leak to ground 102 through resistor 200 and is depicted in graphic form in FIG. 8. In FIG. 8, the ordinate is a measurement of vehicle speed defined as the speed of the faster wheel in units of miles per hour, and the abscissa in a measurement of capacitor memory time in units of seconds.

Operation of locked wheel arming and detection circuit 70 shown in FIG. 7 in the environment of the skid control system of FIGS. 2 and 4 may be best understood with reference to FIG. 9 which is a timing diagram depicting the time relationships of certain signals appearing in locked wheel arming and detection circuit 70 of FIG. 7 and in the skid control system of FIGS. 2 and 4. Graphs a and b in FIG. 9 show exemplary output signals 64", 66" from converters 60, 62, respectively. The ordinates of graphs a and b are measured in units voltage ($v_{60}$, $v_{62}$) and are not necessarily to scale. Graph c in FIG. 9 shows a signal 210 which depicts the current conduction history of transistor 194 in locked wheel arming circuit 189 when circuit 189 is controlled by signals 64", 66" of graphs a and b, respectively. Graph d of FIG. 9 shows a signal 80" depicting the history of the output current of brake amplifier 78 of the skid control system shown in FIG. 2 when the system is under the control of first and second converter signals 64" and 66". In graph e of FIG. 9, a signal 212 depicts the current conduction history of transistor 172 in locked wheel detection circuit 169 of FIG. 7 when circuit 169 is controlled by converter signals 64"', 66"'. The ordinate of graphs c to e are measured in units of current ($i_{94}$, $i_{78}$, $i_{172}$) and are not to scale. The abscissa of FIG. 9 is common to graphs a–e and is measured in units of time.

When the vehicle starts from zero velocity, output signals 64", 66" will increase; but as long as they are both below a minimum arming threshold 214, transistors 190, 192 remain off so that transistor 194 conducts maximum current as shown in graph c of FIG. 9. Signals 64"', 66"' are shown as slightly offset along the time axis indicating an initial velocity differential merely to better illustrate the effects of the signals crossing the thresholds 214, 220. When converter signal 64"', for example, reaches threshold 214 at a time 216, transistor 194 is turned off to thereby enable detection circuit 169. For a detection threshold 220 of 9 m.p.h., the arming threshold 214 must be at least just above 9 m.p.h. In one working embodiment, an arming threshold 214 corresponding to a vehicle speed of 10 m.p.h. results in effective locked wheel arming.

Turning now to locked wheel detection circuit 169, at a time 217 both wheels have an angular velocity represented by converter outputs 64", 66" above a locked wheel detection threshold 220 so that transistor 172 of FIG. 7 will conduct current as shown by signal 212 of graph e in FIG. 9. At a time 218, it is assumed that the operator applies the trailer brakes 40, 42 so that converter outputs 64", 66" decline in the expected fashion. If one of the converter outputs falls below locked wheel threshold 220 (for example, signal 64" from wheel 37 at time 222), transistor 172 turns off to thereby place the voltage of power supply 82 through resistor 186 and diode 188 upon positive terminal 99 of amplifier 96 (FIG. 4). The difference between this voltage and the voltage at negative terminal 97 of amplifier 96 has the same effect as a maximum velocity differential between wheels 37 and 39 so that transistors 130, 132 turn on and transistors 148, 150 turn off to thereby interrupt current to brakes 40, 42. Brake current will be reapplied when converter output signal 64" again exceeds threshold 220.

FIG. 9 also illustrates the situation wherein brake application causes both wheels to lock up and hence both converter output signals 64", 66" drop below detection threshold 220. For example, when signal 66" first drops below threshold 220 at a time 226, the current to brakes 40, 42 is interrupted until both converter signals 64", 66" again exceed threshold 220, as at the time 228, at which time the brake current is automatically resupplied in the manner described above. Assuming that the speed of trailer 32 exceeds 10 m.p.h. when both wheels 37, 39 lock, it will be apparent that capacitor 208 prevents the arming circuit 189 from interpreting the wheel speed signals 64, 66 as indicating that the vehicle speed is less than 10 m.p.h. Hence the charge on capacitor 208 maintains transistors 196, 194 off so that the detection circuit 198 can correct for the locked wheel condition before capacitor 208 discharges. As soon as the wheels spin up after a condition where both wheels were locked, capacitor 208 will be recharged to maintain transistors 194, 196 off in the manner previously described. Since the charge on capacitor 208 is a function of the faster moving wheel just prior to both wheels locking up, for higher vehicle speeds the wheels will have a correspondingly longer period of time in which to spin back up after being locked. When the trailer 32 is moving below 10 m.p.h., the wheels, of course, cannot spin up to more than 10 m.p.h. Hence capacitor 208 will discharge to turn transistors 196, 194 on, correctly interpreting a low level of wheel speed signals 64, 66 so that the arming circuit 189 will disarm the detector circuit 169, thereby causing the brakes to be reapplied.

SWAY CONTROL SYSTEM

Turning now to FIG. 10, there is depicted a tractor-trailer combination similar to that shown in FIG. 1 wherein tractor or towing vehicle 30 attempts to tow trailer 32 along the highway in a substantially straight line 230. However, lateral forces on trailer 32 cause the trailer to pivot about hitch 34 and to describe a substantially sinusoidal pattern 232 about line 230. During this sinusoidal oscillation of trailer 32, the outside wheel at a curved portion of the sinusoidal pattern must travel at a velocity greater than that of the inside wheel. The amplitude of this sinusoidal variation in wheel velocity differential is proportional to the degree of trailer sway. FIG. 11 shows a time history of this difference between the rotational velocity of wheel 37 and the rotational velocity of wheel 39 ($V_{37}$-$V_{39}$). As the sinusoidal pattern 232 described by trailer 32 becomes more pronounced, the difference between the velocity of wheel 37 and the velocity of wheel 39 at the point of maximum lateral displacement of trailer 32 increases in amplitude. Thus the wheel velocity differential between laterally spaced wheels 37 and 39 provides not only an indication that a trailer sway condition exists, but also a signal proportional to the degree of trailer sway.

According to a second aspect of the present invention, there is provided a sway control system for towed vehicles which applies brake torque at the towed vehicle as a function of a wheel rotation differential between the trailer wheels. More specifically, there is provided in accordance with the present invention a sway control system for towed vehicles in which brake torque at a pair of laterally spaced wheels on the towed vehicle is applied in proportion to, and preferably in linear proportion to, the angular velocity differential between said pair of laterally spaced wheels.

Referring to FIG. 12, the sway control system is similar in many respects to the skid control system of FIG. 2 and like reference numerals are used to indicate like elements. The principal difference is in the arrangement of the sway control unit 233 (FIG. 12) that is used as the brake control unit 54 (FIG. 1) in place of the skid control unit 55 (FIG. 2). Wheels 37, 39 are respectively connected to transducers 46, 48 which are, in turn, connected to frequency-to-voltage converters 60, 62 in a manner set forth above with respect to the system depicted in FIG. 2. Converters 60, 62 have first and second outputs 64, 66 respectively connected to differential amplifier 68 and a low speed lockout circuit 234. Differential amplifier output 74 and a low speed lockout output 236 are connected to a rate amplifier 238 having an output 240 connected to a brake driver 242. Brake driver 242 is also connected to battery 84. The output 244 of brake driver 242 is connected to brake units 40, 42, respectively, of the type discussed above with reference to FIG. 2. In general, in response to an increasing wheel velocity differential signal, brake driver 242 automatically delivers an increasing puck current to brakes 40, 42 independent of controller 44. However, controller 44 is also connected to the brakes so that the operator can apply the brakes in the usual manner and also override the automatic sway control, or vice versa depending upon whether controller 44 or the automatic control is calling for the greater braking effort.

Referring to FIG. 13, differential amplifier 68 (FIG. 13) is identical to that described in connection with FIG. 4 and hence is shown in block form. Rate amplifier 238 is substantially identical to rate amplifier 76 (FIG. 4) except that diode 133 (FIG. 4) has been omitted and the output 74 of amplifier 68 is connected directly through resistor 246 to the base of transistor 130, and a connection 248 (FIG. 13) has been added between the base of transistor 130 and low speed lockout circuit 234 (FIG. 12). As will later be described in greater detail, lockout circuit 234 inhibits activation of rate amplifier 238 and brake driver 242 at low vehicle speeds so that trailer 32 can be maneuvered without activating the sway control. This is accomplished by tying the base of transistor 130 to ground 102 through output 236 of lockout circuit 234. Resistor 246 between output 74 and the base of transistor 130 limits the current from differential amplifier 68 to low speed lockout circuit 234 during inhibition of rate amplifier 238. In one working embodiment of the disclosed sway control system tested on the above-mentioned Scamper trailer, resistor 138 of FIG. 13 was set such that a wheel speed differential of zero resulted in substantially zero brake current and a wheel speed differential in the range of 2.5 to 3.1 m.p.h. resulted in maximum brake current. Again the range of 2.5 to 3.1 m.p.h. is empirically based on the Scamper hitch-to-axle length of 12.8 feet, among other factors, and may be changed as conditions require. By way of further example, when the sway control system was tested on a homemade trailer weighing about 2200 pounds and having a hitch-to-axle distance of about 8 feet, resistor 138 was set so that maximum braking current was developed by a 10 m.p.h. wheel speed differential. As is apparent, the remainder of rate amplifier 238 is identical to amplifier 76 (FIG. 4).

Brake driver 242 comprises a pair of NPN transistors 250, 252 connected to the collector of transistor 132 in a Darlington configuration with the collectors of transistors 250, 252 tied together at battery 84 and the emitter of transistor 250 connected to the base of transistor 252. The base of transistor 250 is connected to the collector of transistor 132 so that brake driver 242 will conduct current as a function of the voltage across resistor 146, which voltage is the arithmetic absolute value of the difference between outputs 64 and 66 of converters 60, 62. The emitter of transistor 252 is connected to the cathode of a diode 254 having its anode connected to ground 102. Diode 254 is to prevent inductive ringing in brake coils 41, 43 of brake units 40, 42. The emitter of transistor 242 is also connected to the cathode of a second diode 256 having its anode connected to controller 44. The output 244 of the brake driver 242 appearing at the emitter of transistor 252 is connected to brake coils 41, 43 in brake units 40, 42 by means of a pair of conductors 258, 259 connected to output 244 and ground 102, respectively.

Referring to the low speed lockout circuit 234 shown in detail in FIG. 14, a pair of NPN transistors 260, 262 have their bases connected to converters 60, 62, respectively, and their collectors connected together through a resistor 264 to power supply 82. The emitters of transistors 260, 262 are connected to the base of a PNP transistor 266 and to ground 102 through a resistor 270. A resistor 268 is connected across the emitter-base circuit of transistor 266 to insure that transistor 266 turns off completely. Transistors 260, 262 act as a discriminator with respect to outputs 64, 66 so that the voltage appearing across resistor 270 at the base of transistor 266 will follow the greater of the two outputs. Thus as was the case with locked wheel arming circuit 189 discussed above with reference to FIG. 7, the low speed lockout circuit of FIG. 14 arbitrarily defines vehicle speed as being identical to the speed of the faster rotating wheel.

The emitter of transistor 266 is connected to ground 102 through a resistor 272 and to power supply 82 through a resistor 274. Resistors 272, 274 thus provide a voltage divider network which, when connected to the emitter of transistor 266, determines a low speed lockout threshold 282 (FIG. 15) at which transistor 266 will cease to conduct. The collector of transistor 266 is connected to the base of an NPN transistor 276 which has its emitter connected to ground 102. Output 236 of low speed lockout circuit 234 appears at the collector of transistor 276 and is connected to the base of transistor 130 (FIG. 13) of rate amplifier 238 in the manner set forth above.

Operation of the sway control system set forth in FIGS. 12, 13 and 14 will be best understood with reference to FIG. 15 which is a timing diagram depicting the relationships of certain signals appearing in the sway control system of FIG. 12. In graphs a and b of FIG. 15, output signals 64''', 66''' from converters 60, 62, respectively, have waveforms to exemplify the operation of the system of FIG. 12. The ordinates of graphs a and b are measured in units of voltage ($v_{60}$, $v_{62}$) and are not necessarily to scale. Again the signals 64''', 66''' are shown slightly offset on the time axis to better illustrate the affects of the signals passing through the threshold 282. Graph c of FIG. 15 depicts the time history of output 236' from lockout circuit 234 as the circuit is activated by signals 64''', 66'''. The ordinate of graph c is measured in units of current ($i_{276}$) conducted through transistor 276. Graph d of FIG. 15 depicts output 240' from rate amplifier 238. The ordinate of graph d is thus a measurement of current ($i_{238}$). Graph e in FIG. 15 depicts output 244' from brake driver 242 when the sway control system shown in FIG. 12 is controlled by outputs 64''', 66''' of graphs a and b. The ordinate of graph e is in units of current ($i_{252}$) conducted through transistors 250, 252. The abscissa of FIG. 15 is in units of time.

As indicated earlier, during low speed or city driving, lockout circuit 234 inhibits operation of the sway control system and hence output 236' (graph c in FIG. 15) shows that maximum current is conducted through transistor 276 (FIG. 14), thereby bringing the base of transistor 130 (FIG. 13) to ground. When the velocity of one or both of the wheels (for example, wheel 39) reaches a point where converter signal 66''' passes a low speed lockout threshold 282 at a time 280, transistor 266 will be reverse biased so that transistors 266, 276 will be turned off. Transistor 130 (FIG. 13) is thus enabled to respond to the differential signal 74 (FIG. 13). A low speed lockout threshold 282 corresponding to a vehicle speed of 32 m.p.h. operated effectively in one embodiment of the aforementioned Scamper trailer.

Whenever trailer 32 is maneuvered in traffic, as from one lane to another, a wheel rotation differential will appear between wheels 37, 39 of the trailer. Thus at a time 284 (FIG. 15), signals 64''', 66''' indicate a minor excursion of the trailer 32 from a straight-line path resulting in a small differential signal 240'. A small wheel rotation differential, however, is not usually indicative of a sway condition that needs correction. To prevent a small differential signal from initiating proportional braking, a minimum differential threshold 286 is built into the sway control system of FIG. 13. Transistors 250, 252 each have a base-emitter turn-on voltage of approximately 0.6 volts. Thus a minimum threshold of 1.2 volts is automatically provided. In one working embodiment of the sway control system, this 1.2 volt threshold translated into a velocity threshold 286 of approximately ¾ m.p.h. This was found to operate satisfactorily. However, threshold 286 may be increased by adding diodes to driver 242 in a direction providing forward current conduction from the collector of transistor 132 to the base of transistor 250.

Although a gradual maneuvering from one lane to another produces only a slight wheel velocity differential, the more violent the action in changing from one lane to another, the greater the resultant wheel velocity differential. More importantly, however, as the wheel velocity differential increases, the more likely it is that the trailer 32 will become unstable and begin to sway. Thus it can be seen with reference to FIG. 15 that while the lane changing maneuver at time 284 did not produce an indication of an impending sway condition, the change caused trailer 32 to "overshoot" the track of the towing vehicle 30 to such a degree that at a time 288 differential signal 240' exceeds threshold 286. When this happens, driver circuit 242 is turned on in linear proportion to the differential signal 240' to supply current from battery 84 to the coils in both brakes 40, 42. As shown in FIG. 15, the brake current at output 244' is proportional to the differential signal 240'. The brakes will be applied automatically until the drag at the trailer 32 causes it to realign with the tractor 30 and the wheel speed differential to drop below threshold 286. In the unlikely event that automatic brake operation by brake driver 242 in turn creates a skid, the low-speed lockout 234 prevents continued skidding.

Of course, the same correcting action occurs in response to a wheel speed differential occurring from causes other than lane changing overshoot. Moreover, the sway control provides several other important advantages that are perhaps less apparent. For example, when a blowout occurs at one of the trailer wheels 37, 39, a wheel speed differential develops rapidly which, as in the case of a sway, causes the brakes to be applied. Depending on the blowout condition, the wheel speed differential is a result of two separate factors either alone or in combination. First a wheel speed differential will occur because the trailer will move laterally in a direction away from the wheel at which the blowout occurs, thus producing a wheel speed differential. Secondly, a substantial decrease in the radius of the wheel at which the blowout occurs will also cause a wheel speed differential. Yet a further advantage of the sway control is realized when a driver exits at a freeway interchange. If a driver enters the interchange at an excessive speed, as frequently occurs, the resulting wheel speed differential causes the sway control to apply the trailer brakes, thus slowing the vehicle system to a safe interchange speed. In regard to this latter advantage, it is noted that a lower lockout threshold 282 of say 20 m.p.h. would operate satisfactorily for slow speed cornering and in city traffic. However, the higher threshold of 32 m.p.h. previously referred to is more effective and hence is preferred in that the trailer brakes are not applied automatically when the interchange is taken at a safe speed, as might otherwise occur with the lower threshold of say 20 m.p.h.

COMBINED SKID AND SWAY SYSTEM

According to a third aspect of the present invention, the above detailed skid control system and sway control system are combined into a brake control system for trailers for correcting both skid and sway. Again since the combined system is similar in most respects to the skid control system of FIG. 2 and the sway control system of FIG. 12, like reference numerals are used in FIGS. 16-18 to indicate like elements from FIGS. 2, 4, 12 and 13. The principal difference is in the arrangement of the combined skid and sway control unit 289 (FIG. 16) that is used as the brake control unit 54 (FIG. 1) in place of the skid control unit 55 (FIG. 2) and the sway control unit 233 (FIG. 12). In general, the combined skid and sway control system regulates brake torque at the wheels of the trailer as a function of a detected wheel rotation differential between the wheels. If the operator has applied brakes 40, 42 of trailer 32, a wheel speed differential is interpreted as an impending skid and the brakes are released in proportion to the velocity differential. When the trailer brakes are not being applied by the operator, a wheel speed differential is interpreted as a sway and the brakes are applied at the wheels of the trailer 32 in porportion to the velocity differential.

Referring now to FIG. 16 and the detail of combined unit 289, the converter output signals 64, 66 vary as a function of the rotation of wheels 37, 39 as sensed by transducers 46, 48 and converters 60, 62, respectively. Converter outputs 64, 66 are each fed to locked wheel circuit 70, lockout circuit 234 and differential amplifier 68. Locked wheel output 72 is connected to differential amplifier 68 in a manner identical to that set forth in connection with FIGS. 4 and 6 and operates in a similar manner to cause the brakes to be released completely under certain conditions. Differential amplifier output 74 is connected to a skid rate amplifier 76 and a sway rate amplifier 238. Output 236 of low speed lockout circuit 234 is connected to sway rate amplifier 238 in the same manner and with the same effect as discussed above with reference to FIGS. 12-15. Sway and skid rate amplifiers 238 and 76 have outputs 240 and 77 respectively connected to antisway driver 296 and antiskid driver 298. A mode selector 302 receives an input 308 from an external stop lamp switch or controller 310 and has the outputs 304, 306 respectively connected to antisway driver 296 and antiskid driver 298. Battery 84 is connected to antisway driver 296, power supply 82 and controller 44 which is, in turn, connected to antiskid driver 298. The output of antisway driver 296 is connected through the antiskid driver 298 to brake units 40, 42. In the absence of an impending skid, brake current can be supplied to brakes 40, 42 through antiskid driver 298 by either controller 44 or antisway driver 296.

In the stop lamp controller 310 (FIG. 17), battery 84 powers operator responsive controller 44 for activating brake units 40, 42 of the trailer 32. Battery 84 is also connected to the usual stop light switch 316 in the brake system (not shown) of the tractor 30; for example, the hydraulically or mechanically actuated stop light switch on the master cylinder or on the service brake pedal linkage of a hydraulic brake system. The outputs 317, 319 of controller 44 and switch 316 are respectively connected to ground 102 through a stop light 322 in tractor 30 and a parallelled stop light 324 in trailer 32 and also to provide the output 308 to selector 302 (FIG. 16). Thus when the operator applies the tractor brakes (not shown) or the trailer brakes 40, 42 (via controller 44), the controller output 308 switches from a voltage near ground to a voltage which is that of battery 84.

FIG. 18 depicts in schematic form exemplary but preferred embodiments of antisway driver 296, antiskid driver 298 and mode selector 302 of the block diagram of FIG. 16. The remaining circuits in FIG. 18 are set forth in block form and have configurations respectively identical to similarly numbered circuits in FIGS. 4, 7, 13 and 14.

Antisway driver 296 comprises a pair of NPN transistors 334, 336 connected to each other in a standard Darlington configuration with the collectors of transistors 334, 336 connected to battery 84 and the emitter of transistor 334 connected to the base of transistor 336. The base of transistor 334 comprises the input to antisway driver 296 and is connected to antisway rate amplifier 238. The emitter of transistor 336 comprises the output of antisway driver 296 and is connected by output line 312 to brake coils 41, 43 in brake units 40, 42. The emitter of transistor 336 is also connected to the cathodes of first and second diodes 338, 340. The anode of diode 340 is connected to operator responsive controller 44. Diode 340 and the base-emitter junction of transistor 336 thus isolate controller 44 and antisway driver 296 from each other. The anode of diode 338 is connected to return line 314, thus shunting coils 41, 43 in units 40, 42 in the usual manner to suppress inductive ringing therein.

Antiskid driver 298 comprises a pair of PNP transistors 342, 344 also connected to each other in a standard Darlington configuration with the collectors of transistors 342, 344 connected to ground 102 and the emitter of transistor 342 connected to the base of transistor 344. The input of antiskid driver 298 comprises the base of transistor 342 and is connected to the output of antiskid rate amplifier 76. Resistor 346 insures that the transistors 342, 344 can be fully turned off.

Mode selector 302 comprises the first and second transistor switches 348, 362 which provide the respective output signals 306, 304 to selectively enable either the antiskid driver 298 or the antisway driver 296. Switch 348 comprises a pair of NPN transistors 350, 352. The base of transistor 350 is connected to stop lamp controller 310 through a resistor 354, the emitter is connected to ground 102, and the collector is connected to battery 84 through a resistor 356 and to the base of transistor 352 through a resistor 358. The emitter of transistor 352 is connected to ground 102 while the collector is connected to the base of transistor 344. A high or twelve-volt signal 308 from stop lamp controller 310, which signal indicates that the brakes are being applied in either the towed or towing vehicle, will be inverted first in transistor 350 and again in transistor 352 to enable antiskid circuit 298 by reverse biasing the base-emitter junction of transistor 352. Conversely, a low or ground signal 308 from controller 310 goes through a similar double inversion in transistors 350, 352, thereby grounding the base of transistor 344. With the base of transistor 344 connected to ground, current to the brake coils of brake units 40, 42 as supplied by antisway driver 296 will be returned to ground through transistors 344, 352. If controller 310 is actuated, transistor 352 turns off and current flows from controller 44 through coils 41, 43 and fully conducting transistors 342, 344. Should a skid condition develop, driver 298 will regulate current from controller 44 according to the differential signal from amplifier 76.

Switch 362 of mode selector 302 comprises an NPN transistor 360 which has its emitter connected to ground 102, its base connected to the base of transistor 350 and its collector connected to the base of transistor 334 which is the input of antisway driver 296. A high or twelve-volt signal 308 from controller 310 is inverted by transistor 360 to ground the base of transistor 334, thus inhibiting antisway driver 296 when the operator has applied the brakes of either tractor 30 or trailer 32. Conversely, a ground or low signal 308 from controller 310 will reverse bias the base-emitter junction of transistor 360, thus enabling antisway driver 296 to respond to a differential output from amplifier 238.

It can thus be seen that mode selector 302 selectively inhibits antisway driver 296 or antiskid driver 298. The remaining circuit and operation details of the combined system (FIGS. 16 and 18) should be readily apparent from the prior description in connection with FIGS. 2 and 4–15.

While the present invention has been described hereinabove in connection with specific skid, sway and combined embodiments, numerous modifications and variations are contemplated. Although the invention is particularly adapted for trailers having electric brakes, as indicated earlier, the antiskid system can be easily modified for hydraulic or pneumatic trailer brakes. One such modification of the disclosed skid control system was discussed in detail above in connection with FIGS. 3a and 3b. Another embodiment of an electrohydraulic skid control system in accordance with the invention is shown in FIG. 19 wherein reference numerals identical to those used in early figures, particularly in FIGS. 2 and 4, indicate identical components or blocks. Referring to FIG. 19, a metering valve 400 has a hydraulic pressure input line 402 from a source of fluid pressure, a return line 404 to the pressure source, and is adapted to meter fluid pressure to the trailer brakes via line 406 in proportion to the current through a valve drive coil 408. Coil 408 is in electrical series connection between brake controller 44 and controlled conduction transistors 148, 150 in skid control brake amplifier 78. Thus, in one of its broader aspects, the present invention contemplates a skid control system, including at least one controlled conduction device (148, 150), in electrical series connection with a brake controller (44) and an electrically operated brake actuator, such as a brake puck (40, 42) in an electric brake system or a solenoid-controlled metering valve (400) in an electrohydraulic brake system.

It will also be evident that the sway control system for electric brake systems disclosed in FIGS. 12–14 and the combined skid and sway control system disclosed in FIGS. 16–18 are readily adaptable for use in electrohydraulic brake systems of the type shown in FIG. 19. For example, sway brake driver (242 in FIG. 12 or 296 in FIG. 16) may be connected in parallel with controller 44, such that metering valve coil 408 is selectively energized by either the sway control driver or the controller. The skid system could, of course, be used to regulate the brakes on an automobile or the like. In this regard, it is noted that, according to one of the more important features of the present invention, the brakes are controlled at paired wheels according to the wheel speed differential between the wheels, both in the skid embodiment, the sway embodiment and the combined embodiment. This technique is particularly advantageous since it is compatible with brake systems presently in use commercially on trailers and automobiles. Hence it is a relatively simple matter to install the brake control unit 54 of FIG. 1 on a trailer either during original manufacturing or as an add-on accessory. The same installation advantages could also be realized in connection with installation of a skid control on an automobile having dual braking systems; i.e., the rear wheels being paired to one master cylinder and the front wheels paired to another master cylinder.

Although the described skid and sway correction systems of the present invention have particular applicability to a single axle trailer, it will also be apparent that the invention can be easily adapted for regulating the brakes to correct for skid and/or sway at multiple pairs of wheels on multi-axle trailers. For example, on a dual axle trailer having two wheels at each side of the trailer with the wheels at each side spaced longitudinally of the trailer, the brakes to all four wheels can be regulated according to the wheel speed differential between one pair of wheels, that is, from one wheel at one side of the trailer and from one wheel at the other side of the trailer. In such a dual wheel application, the differential signal would preferably be derived from corresponding wheels at either side of the trailer, either from the pair of forward wheels or the pair of rearward wheels. However, it will also be apparent that one pair of wheels could be controlled according to a differential signal derived from the other pair of wheels; i.e., the brakes at the rearward wheels could be regulated according to a differential signal derived from the forward wheels, or vice versa, with suitable compensation according to the distance of the respective pairs of wheels from the trailer hitch. It could also be theoretically possible depending on the longitudinal space between the forward and rearward wheel to develop the differential signal from the forward wheel at one side of the trailer and the rearward wheel at the other side of the trailer. Hence in its broadest aspects, the present invention can be applied to trailers and other vehicles wherein the wheels at one side of the vehicle may be classified as one wheel unit containing either one or multiple wheels and the wheels at the other side of the vehicle are classified as a second wheel unit again containing either one or multiple wheels. In such a situation, broadly speaking, the present invention contemplates actuating the brakes at one or more of the wheels in each of the two wheel units according to a differential signal derived from one or more of the wheels in both of the wheel units but, at least for the sway control, not necessarily the same wheel or wheels at which the brakes are being regulated.

In each of the brake control systems hereinbefore disclosed, the primary means for applying trailer current to the trailer brake actuator, i.e., controller 44, has been described as being directly responsive to operator control in accordance with the above-referenced Hubbard and VandenBroek patents. However, it will be apparent that the disclosed skid, sway and combined systems are equally useful in combination with an automatic brake controller 410 of the type shown in FIG. 20, which is adapted to apply brake torque at the trailer wheels as a function of tractor-trailer deceleration and is thus only indirectly responsive to operator control. Referring to FIG. 20, the emitter junction of transistors 190, 192, which follows the faster moving wheel as explained above in connection with FIG. 7, is connected to memory capacitor 208 (FIG. 7) through an isolation diode 412. The emitter junction is also connected through a second isolation diode 414, a differentiating capacitor 416 and a resistor 418 to the inverting input 420 of an operational amplifier 422. The junction of capacitor 416 and resistor 418 is connected to ground 102 through a resistor 424. The output 426 of amplifier 422 is connected to inverting input 420 through a resistor 428, and then to bus 82 through a resistor 430. The non-inverting input 432 of amplifier 422 is connected to bus 82 through a resistor 434 and to ground 102 through resistors 436, 438. Resistor 436 is preferably made adjustable for factory setting of the threshold of amplifier 422.

Amplifier output 426 is connected through a resistor 440 to the base of an NPN transistor 442 which has its collector connected to battery 84 through a resistor 444. A PNP transistor 446 has its collector connected to the base of a complementary NPN transistor 448 at the emitter of transistor 442, its base connected to the collector of transistor 442 and its emitter connected to the collector of transistor 448 at battery 84. The emitter of transistor 448, which comprises the output of automatic brake controller 410, is connected to coils 41, 43 of brake pucks 40, 42. A diode 450 is connected in the reverse voltage direction across coils 41, 43. The tractor brake light switch, such as that depicted at switch 316 (FIG. 17), is connected through a resistor 452 to the base of an NPN transistor 454. Transistor 454 has its emitter connected to ground 102, and its collector connected to ground through a resistor 456 and to battery 84 through a resistor 458. An NPN transistor 460 has its base connected to the collector of transistor 454, its emitter connected to ground 102 and its collector connected to the base of transistor 442.

In the operation of automatic brake controller 410, when tractor brakes are not being applied, stop lamp switch 316 is open, transistor 454 is turned off, and transistor 460 is turned on effectively connecting the base of transistor 442 to ground 102. The controller is armed or enabled by closure of the stop lamp switch which places a high voltage at the base of transistor 454 and thereby turns off transistor 460. When tractor brakes are applied, the tractor-trailer combination and, therefore, the trailer wheels begin to decelerate. As noted above, the emitter junction of transistors 190, 192 follows the speed of the faster moving trailer wheel. Capacitor 416 in combination with resistors 430, 418 and 424 differentiates the faster wheel speed signal to yield at inverting input 420 a signal indicative of wheel deceleration. When and in proportion to the extent that the wheel deceleration input to amplifier input 420 exceeds the preset threshold at input 432, i.e., when and to the extent that the voltage at input 420 is below that at input 432, amplifier 422 turns on, and transistors 442, 446 and 448 conduct current to brake pucks 40, 42 in proportion to the deceleration signal. Thus, controller 410 senses deceleration of the tractor-trailer combination due to the application of the tractor brakes as a function of trailer wheel rotation and applies current to the trailer brakes in proportion thereto. The amplifier threshold is preferably factory adjusted via resistor 436 to the coasting or free-rolling deceleration of the tractor-trailer combination with which the controller will be used which, in the case of an average automobile and a medium-sized camper trailer, is a deceleration of about five feet per second per second (5 ft/sec$^2$).

Automatic controller 410 shown in FIG. 20 may be used alone or may be readily combined with any of the skid, sway or combined systems shown in the previous drawings. For example, the sway brake driver (242 in FIG. 12, 296 in FIG. 16) may be connected in parallel with or preferably may comprise controller output transistors 442, 446 and 448 such that the output of sway rate amplifier 238 (FIGS. 12 and 16) is connected through a suitable isolation diode to the base of transistor 442. It will also be evident that, where controller 410 is to be combined with a sway control system alone, transistors 190, 192 shown in FIG. 20 and heretofore associated with the skid locked wheel arming circuit (FIG. 7) may be replaced by transistors 260, 262 of the sway low-speed lockout circuit (FIG. 14) which perform essentially the same function. Similarly, where automatic brake controller 410 is to be used in combination with a skid control system, the output of skid rate amplifier 76 (FIGS. 2 and 16) may be connected through an isolation diode 462 to the base of transistor 446, as shown in FIG. 20, such that the need for a separate skid brake amplifier (78 in FIG. 2, 298 in FIG. 16) is eliminated. This is of particular importance where the controller 410 and the skid control system are to be produced by the same manufacturer since a separate skid control system, including a skid brake amplifier, need not be connected by the ultimate consumer externally of the controller.

The automatic brake controller 410 may, of course, be readily used in place of controller 44 with the electrohydraulic brake system shown in FIG. 19. Similarly, automatic brake controller 410 may be used in combination with manual controller 44 in any of the electric or electrohydraulic skid, sway or combined systems heretofore described by merely connecting the output of controller 44 to the appropriate brake actuators in parallel with the output of controller 410. Where controllers 410 and 44 are both to be used with a combined system of the type depicted in FIGS. 16-18, it is presently considered desirable to isolate the output of stop lamp switch 316 (FIG. 17) from the output of controller 44 at the input to the base of transistor 454 (FIG. 20) through the use of a suitable isolation diode or the like, so that controller 410 is only enabled when the tractor brakes are actuated.

Although the sway control system has been disclosed herein as being responsive to a wheel speed differential between laterally spaced trailer wheels to detect a sway condition, it will be evident that, in its broader aspects, the present invention envisions other means and techniques for detecting a sway condition as a function of trailer wheel rotation. Although wheel speed differential detection has the many advantages hereinbefore described, it is contemplated that other trailer wheel rotation parameters, such as displacement or deceleration, for example, may in appropriate circumstances be monitored to detect a sway condition. Indeed, in the broader aspects of both the sway control systems and the automatic brake controller disclosed in FIG. 20, trailer condition is sensed and trailer brakes are applied as a function of trailer wheel rotation. More specifically, in both the sway system and the automatic controller, wheel rotation of at least one trailer wheel is sensed (velocity in the case of sway and deceleration in the case of the controller), the sensed wheel rotation is compared to a reference (another wheel rotation in the case of sway and a deceleration threshold in the case of the automatic controller), a correction indication is derived from the comparison, and braking forces are applied to at least two trailer wheels. Such brake application at the trailer wheels will be essentially simultaneous within the bounds of brake system inertia, etc.

As indicated earlier, a very important commercial advantage of the present invention is achieved because the skid embodiment, the sway embodiment and the combined embodiment, as well as the automatic brake controller shown in FIG. 20, all have certain parts and operating features in common. Hence significant cost advantages can be achieved, not only by the manufacturer but also by dealers and users. Of course, it is apparent that manufacturing costs of all four systems are reduced due to part interchangeability. However, and perhaps even more importantly, the present invention provides a manufacturer with options depending on commercial need. For example, initial production on a commercial scale might be to satisfy a demand for either the skid control or the sway control. After initial commercialization of either one of these basic systems, the commercialization of the other system is greatly simplified. Finally, having once commercialized either the sway system or the skid system or both, commercialization of the combined system is greatly simplified. These manufacturing options should also benefit the consumer in that, depending on the consumer's needs or existing safety requirements, the consumer will have the option of purchasing either a skid system, a sway system or a combined system. In such a situation, the present invention also contemplates sufficient part interchangeability so that if the consumer initially purchases the skid control system, for example, it will be less expensive for the consumer to later add the sway system or replace the skid system with a combined system. As noted above, the manufacturer has the further option of manufacturing the automatic brake controller separately of the skid, sway and combined systems, or may produce the controller and one of the latter systems as an integral unit and thereby achieve significant cost advantages due to commonality between and/or elimination of various system components.

Most importantly, the present invention achieves reliable and effective skid and/or sway control or both, yet it is reasonably low in cost and easy to install and service. The effectiveness of the present invention is somewhat surprising in that prior art attempts in the skid control field, for example, detect an impending skid and correct same at an individual wheel, as contrasted to controlling the brakes at pairs of wheels as in the present invention. Although it might initially appear that overall braking effectiveness would be impaired by releasing both wheels, in the case of correcting for an impending skid, extensive road testing has clearly shown the contrary and very effective results have been achieved.

It will be understood that the sway control system, the skid control system, the combined system and the automatic trailer brake controller have been described hereinabove for purposes of illustration and are not intended to indicate limits of the present invention, the scope of which is defined in the following claims.

I claim:

1. In a brake control system for use in an articulated system including a towing vehicle and a towed vehicle such as a trailer or the like of the type having first and second nondriven wheel units disposed at respective opposite sides of said towed vehicle, each wheel unit having at least one wheel therein, first and second brake means operatively associated with at least one wheel in each wheel unit, respectively, and brake activating means adapted to apply said first and said second brake means, the combination comprising first wheel sensing means responsive to rotation of at least a first wheel in at least a first of said wheel units for generating a first electrical signal which varies as a function of rotation of said first wheel, means responsive to said first signal when said towed vehicle is in a sway condition to provide a brake correction signal and brake regulating means operatively coupled to said brake activating means and responsive to said brake correction signal to apply said first brake means at one wheel in said first brake unit and simultaneously apply said second brake means at one wheel in said second unit to thereby increase the drag on said towed vehicle and correct said swaying condition.

2. The combination set forth in claim 1 wherein said wheel units are spaced at substantially the same longitudinal distance from a hitch connection.

3. The combination set forth in claim 1 wherein said pair of wheel units are carried at respective opposite ends of a single trailer axle.

4. The combination set forth in claim 1 wherein said pair of wheel units are carried at respective opposite ends of a pair of tandem axles.

5. The combination set forth in claim 1 wherein said regulating means is responsive to said brake correction signal to simultaneously apply said first and said second brake means proportionally to said brake correction signal.

6. The combination set forth in claim 5 wherein said regulating means comprises amplifier means and said amplifier means is arranged and constructed to increase brake application at said first and said second brake means in linear proportion to increases in said brake correction signal.

7. The combination set forth in claim 1 further comprising second wheel sensing means responsive to rotation of a first wheel in the other of said wheel units for generating a second electrical signal which varies as a function of rotation of said first wheel in said other wheel unit and wherein said means for providing said brake correction signal comprises means for comparing said first and second wheel signals to each other to provide a differential signal representing a difference therebetween, said differential signal being said brake correction signal, and wherein said regulating means is responsive to said differential signal to apply both said first and second brake means.

8. The combination set forth in claim 7 wherein said first and said second brake means are operatively associated with a respective first wheel in said first wheel unit and a second wheel in said second wheel unit and said first and said second wheel sensing means are operatively associated with said first and said second wheels, respectively, so that brake application is regulated at the same two wheels from which said first and said second signals were derived.

9. The combination set forth in claim 7 further comprising lockout circuit means for inhibiting said regulating means from applying said brake means until after said towed vehicle has reached a predetermined speed, said lockout circuit means comprising first detection circuit means responsive to said first and second signals to provide a third signal if both of said first and second signals are below a first predetermined level, and output means coupled to said regulating means to disable said regulating means in response to said third signal and thereby prevent said regulating means from causing application of said brake means until said towed vehicle reaches said predetermined speed.

10. The combination set forth in claim 9 wherein said first predetermined level corresponds to a towed vehicle velocity on the order of thirty-two miles per hour.

11. The combination set forth in claim 7 wherein said first and second wheel sensing means both include respective means responsive to wheel rotation such that said first and said second electrical signals are a function of angular velocity of the respective associated wheels, said comparing means being responsive to said first and second signals such that said brake correction signal represents a difference between angular velocities of said first wheels in both wheel units.

12. The combination set forth in claim 11 wherein said first and second electrical signals are proportional to angular velocities of their respective associated wheels and said brake correction signal is proportional to said difference in angular velocities between said first wheel in said first wheel unit and said first wheel in the other wheel unit.

13. The combination set forth in claim 12 wherein said brake system is a combined system adapted to correct for skid conditions and for sway conditions at said towed vehicle, said regulating means comprises mode selection means for providing a sway mode signal when said brake correction signal is to be interpreted as a sway correction signal and for providing a skid mode signal when said correction signal is to be interpreted as a skid correction signal, said regulating means further comprises first brake driver means responsive to said sway mode signal and said correction signal to apply said first and said second brake means as a function of said correction signal to correct for a sway condition and second brake driver means responsive to said skid mode signal and said correction signal to release said first and said second brake means as a function of said correction signal to correct for a skid condition.

14. The combination set forth in claim 12 wherein said brake regulation means is responsive to said brake correction signal to simultaneously apply said first and said second brake means proportionally to said correction signal such that a change in wheel speed differential between said first wheel in said first wheel unit and said first wheel in the other wheel unit causes a corresponding increase in brake application at both of said wheel units.

15. The combination set forth in claim 14 wherein said regulating means further includes means rendering said differential signal ineffective to cause brake application until said differential signal reaches a predetermined level.

16. The combination set forth in claim 15 wherein said predetermined level corresponds to a wheel speed differential on the order of one mile per hour.

17. The combination set forth in claim 14 wherein said brake system is a combined system adapted to correct for skid conditions and for sway conditions at said towed vehicle, said regulating means comprises mode selection means for providing a sway mode signal when said brake correction signal is to be interpreted as a sway correction signal and for providing a skid mode signal when said correction signal is to be interpreted as a skid correction signal, said regulating means further comprises first brake driver means responsive to said sway mode signal and said correction signal to apply said first and said second brake means proportionally to said correction signal to correct for a sway condition and second brake driver means responsive to said skid mode signal and said correction signal to release said first and said second brake means proportionally to said correction signal to correct for a skid condition.

18. The combination set forth in claim 17 wherein said regulating means is arranged and constructed so that said first brake driver means applies said brake means at both wheel units substantially equally and proportionally to said differential signal to correct for a sway condition and said second brake driver means releases said brake means at both wheel units substantially equally and proportionally to said differential signal to correct for a skid condition.

19. The combination set forth in claim 17 wherein said regulating means comprises first rate circuit means operatively associated with said first brake driver means so that said brake means are applied at a first predetermined rate in response to variations in said correction signal and second rate circuit means operatively associated with said second brake driver means so that said brake means are released at a second predetermined rate, different from said first rate, in response to variations in said correction signal.

20. The combination set forth in claim 17 wherein said first and second brake means are electric brakes each of which has an actuating coil adapted to receive brake current from a battery via a controller in said brake activating means, said controller being under the control of said operator, said first brake driver means being connected in circuit with said battery and said coils so as to supply brake current from said battery to said coils independent of said controller, said second brake driver means being connected in circuit with said controller so as to decrease brake current supplied to said coils via said controller, and wherein said mode selection means is operatively connected to said first brake driver means and said second brake driver means to disable said first brake means and enable said second brake driver means when said controller is being operated by said operator whereby said correction signal is interpreted as indicating a skid condition and said second brake driver means will decrease current to said coils in response to said correction signal, said mode selection means also being operatively connected to said first brake driver means and said second brake driver means to enable said first brake driver means when said controller is not being operated by said operator whereby said correction signal is interpreted as indicating a sway condition and said first brake driver means will supply current to said coils in response to said correction signal.

21. The combination set forth in claim 20 wherein said towing vehicle includes a brake system and said mode selection means is operatively connected to said brake system of said towing vehicle to enable said second brake driver means when said towing vehicle brake system is activated by said operator and to enable said first brake driver means when said towing vehicle brake system is not operated by said operator.

22. The combination set forth in claim 7 wherein said regulating means is responsive to said differential signal to simultaneously apply said first and said second brake means proportionally to said differential signal such than an increase in wheel rotation differential between said first wheel in each of said wheel units causes a corresponding increase in brake application.

23. The combination set forth in claim 22 wherein said first and second brake means are electric brakes each of which has an actuating coil adapted to receive brake current from a battery via a controller in said brake activating means, said controller being under the control of said operator, said regulating means being connected in circuit with said battery and said coils and operable in response to said differential signal to supply current to said coils from said battery independently of said controller to thereby increase brake application and correct for a sway condition at said towed vehicle.

24. The combination set forth in claim 1 wherein said regulating means is operable in a first mode to reduce brake application at one wheel in each wheel unit according to said correction signal and thereby correct for a skid condition and operable in a second mode to increase brake application at one wheel in each wheel unit according to said correction signal and thereby correct for a sway condition, said regulating means including mode selection means operable to switch said regulating means from one operating mode to the other operating mode depending on whether said correction signal is to be interpreted as representing a skid condition or a sway condition.

25. The combination set forth in claim 1 wherein said first and second brake means are electric brakes each of which has an actuating coil adapted to receive brake current from a battery via a controller in said brake activating means, said controller being under the control of said operator, said regulating means being operatively connected to said controller, said battery and said coils so as to be operable in a first mode to decrease current supplied to said coils via said controller in accordance with said correction signal to thereby decrease brake application and correct for a skid condition at said towed vehicle and operable in a second mode to supply current to said coils from said battery in accordance with said correction signal independently of said controller to thereby increase brake application and correct for a sway condition at said towed vehicle, said regulating means including mode selection means operable to switch said regulating means from one operating mode to the other operating mode depending on whether said correction signal is to be interpreted as representing a skid condition or a sway condition.

26. The combination set forth in claim 25 wherein said mode selection means is coupled to said brake activating means and is operable according to whether said operator is actuating said brake activating means.

27. The combination set forth in claim 1 wherein said brake system is a combined system adapted to correct for skid conditions and for sway conditions at said towed vehicle, said regulating means comprises mode selection means for providing a sway mode signal when said brake correction signal is to be interpreted as a sway correction signal and for providing a skid mode signal when said correction signal is to be interpreted as a skid correction signal, said regulating means further comprises first brake driver means responsive to said sway mode signal and said correction signal to apply said first and said second brake means as a function of said correction signal to correct for a sway condition and second brake driver means responsive to said skid mode signal and said correction signal to release said first and said second brake means as a function of said correction signal to correct for a skid condition.

28. The combination set forth in claim 27 wherein said first wheel sensing means and said first brake means are operatively associated with the same wheel in said first wheel unit and said second wheel sensing means and said second brake means are operatively associated with the same wheel in said second brake means.

29. The combination set forth in claim 27 further comprising locked wheel circuit means for overriding release of said brake means by said second brake driver means, and wherein said locked wheel circuit means comprises first detection circuit means responsive to said first and said second signals for providing a fifth signal when either one of said first and said second signals is less than a first predetermined minimum level, and output means coupled to said second brake driver means to cause said second brake driver means to completely release said first and second brake means in response to said fifth signal so that if one or both of said wheels locks, said first and said second brake means are completely released to correct for an impending skid.

30. The combination set forth in claim 29 further comprising lockout circuit means for inhibiting said first brake driver means from applying said brake means until after said towed vehicle has reached a predetermined speed, said lockout circuit means comprising first detection circuit means responsive to said first and second signals to provide a sixth signal if both of said first and second signals are below a predetermined level, and output means coupled to said first brake driver means to disable said first brake driver means in response to said sixth signal and thereby prevent said regulating means from causing application of said brake means until said towed vehicle reaches said predetermined speed.

31. The combination set forth in claim 27 further comprising lockout circuit means for inhibiting said first brake driver means from applying said brake means until after said towed vehicle has reached a predetermined speed, said lockout circuit means comprising first detection circuit means responsive to said first and second signals to provide a fifth signal if both of said first and second signals are below a predetermined level, and output means coupled to said first brake driver means to disable said first brake driver means in response to said fifth signal and thereby prevent said regulating means from causing application of said brake means until said towed vehicle reaches said predetermined speed.

32. The combination set forth in claim 27 wherein said first brake driver means is responsive to said sway mode signal and said correction signal to apply said first and said second brake means proportionally to said correction signal and wherein said second brake driver means is responsive to said skid mode signal and said correction signal to release said first and said second brake means proportionally to said correction signal.

33. The combination set forth in claim 27 wherein said brake activating means is actuated by an operator of said towing vehicle to apply said first and said second brake means and wherein said mode selection means comprises means for sensing whether said brake activating means is being actuated by said operator with said sway mode signal being provided by said mode selection means when said brake activating means is not being actuated by said operator and said skid mode signal is provided by said mode selection means when said brake activating means is actuated by said operator.

34. In a brake control system for use in an articulated system including a towing vehicle and a towed vehicle such as a trailer or the like having towed vehicle operator responsive brake activating means for applying brake torque at each of a pair of wheel units located respectively at opposite sides of said towed vehicle, each of said pair of wheel units comprising at least one wheel, the combination for correcting sway of said towed vehicle comprising means generating first and second signals which vary as a function of wheel rotation of at least one wheel of each of said pair of units, respectively, means comparing said first and second signals to each other and providing a differential signal representing a difference between said first and second signals, and regulating means operatively coupled to said brake activating means and responsive to said differential signal to simultaneously apply brake torque at both wheel units substantially equally and in proportion to said differential signal.

35. The combination set forth in claim 34 wherein said first and second signals are proportional to the angular velocity of at least one wheel of each of said pair of wheel units, respectively.

36. The combination set forth in claim 34 wherein said differential signal is linearly proportional to said difference, and wherein said regulating means applies brake torque at both wheel units in linear proportion to said differential signal.

37. The combination set forth in claim 34 wherein said regulating means comprises mode selection means operatively connected to said operator responsive brake activating means to determine whether brake torque is being applied to said pair of wheel units by said activating means, including means providing a third signal when said operator responsive means is activated and means providing a fourth signal when said operator responsive means is not activated, means responsive to said third signal to decrease said operator applied brake torque at both wheel units of said pair at a first rate in proportion to said differential signal, and means responsive to said fourth signal to apply brake torque at both wheel units of said pair at a second rate proportional to said differential signal.

38. The combination set forth in claim 37 wherein said mode selection means comprises first and second switch means, respectively, and means operatively connecting said first and second switch means to said operator responsive brake activating means to render said first and second switch means nonconductive and conductive, respectively, when said operator responsive means is activated and conductive and nonconductive, respectively, when said operator responsive means is not activated, and wherein said differential signal providing means includes amplification means connected to said second switch means and responsive thereto to amplify said differential signal at said first and second rates depending on the conductivity of said first and second switch means.

39. The method of correcting for lateral sway of a towed vehicle of the type having a pair of wheel units disposed respectively at opposite sides of said towed vehicle, each unit having at least one wheel, comprising the steps of sensing wheel rotation of at least one wheel in a first of said wheel units, comparing said sensed wheel rotation with a reference to provide a correction indication when said wheel rotation of said one wheel in said first unit deviates from said reference and simultaneously applying braking forces to at least one wheel in each of said wheel units in response to said correction indication.

40. The method set forth in claim 39 wherein said output indication varies as a function of the difference between said reference and said sensed wheel rotation of said one wheel in said first wheel unit and wherein said braking forces are applied proportionally to said differential correction indication.

41. The method set forth in claim 40 wherein said reference is derived from wheel rotation of one wheel in the other wheel unit.

42. The method set forth in claim 41 wherein wheel rotation of at least one wheel in said first wheel unit and one wheel in said other wheel unit are sensed by sensing angular velocity such that said output indication varies according to a velocity differential between said first wheels in the respective wheel units.

43. The method set forth in claim 42 wherein braking forces are applied according to said velocity differential at the same wheel in each wheel unit at which said angular wheel velocities are sensed.

44. The method set forth in claim 42 wherein said braking forces are applied at a wheel in each wheel unit in linear proportion to said velocity differential.

45. The method set forth in claim 42 wherein application of said braking forces according to said velocity differential is inhibited until said vehicle reaches a speed on the order of from approximately twenty to thirty-five miles per hour.

46. The method set forth in claim 39 wherein braking forces are applied as a function of said correction indication only when an operator of a towing vehicle is not causing braking forces to be applied at the towed vehicle and wherein an impending skid of said towed vehicle is also corrected by sensing when said operator is causing braking forces to be applied at said towed vehicle and then automatically causing braking forces to be released at one wheel in each wheel unit as a function of said correction indication.

47. The method set forth in claim 46 wherein braking forces at said towed vehicle caused by said operator are released proportionally to said correction indication to correct for an impending skid and wherein when said operator is not causing braking forces to be applied at said towed vehicle, braking forces are applied automatically at said towed vehicle in proportion to said correction indication to correct for a lateral sway.

48. In a brake control system for use in an articulated vehicle system including a towing vehicle and a towed vehicle such as a trailer or the like having first and second nondriven wheel units disposed at respective opposite sides of said towed vehicle, each wheel unit having at least one wheel therein, first brake means operatively associated with at least one wheel in said first wheel unit, second brake means operatively associated with at least one wheel in said second unit, brake actuating means adapted to be controlled by an operator of a towing vehicle to apply said first and said second brake means, sway control means adapted to sense a sway condition at said trailer and operative to automatically apply said first and second brake means in response to said sway condition independent of said brake actuating means, skid control means adapted to sense an impending skid condition at one of said wheels occurring when the operator causes said brake actuating means to be actuated and operative to interrupt brake application at said first and second brake means, and selection means operative to disable said sway control means when said operator causes said brake actuating means to be actuated.

49. The brake control system set forth in claim 48 wherein said sway control means comprises first and second means for generating respective first and second signals which vary as a function of wheel rotation of at least one wheel in each of said wheel units, respectively, means for comparing said first and second signals to each other and providing a differential signal representing a difference between said first and second signals and third means operatively coupled to said brake actuating means and responsive to said differential signal for applying said first and second brake means as a function of said differential signal.

50. The brake control system set forth in claim 48 wherein said skid control means comprises first and second means for generating respective first and second signals which vary as a function of wheel rotation of at least one wheel in each of said wheel units, respectively, means for comparing said first and second signals to each other and providing a differential signal representing a difference between said first and second signals and third means operatively coupled to said brake actuating means and responsive to said differential signal for releasing said first and second brake means as a function of said differential signal.

51. The brake control system set forth in claim 50 wherein said sway control means comprises fourth means operatively coupled to said first and said second brake means and responsive to said differential signal for applying said first and second brake means as a function of said differential signal.

52. The brake control system set forth in claim 51 wherein said means to disable said sway control means includes means responsive to actuation of said brake actuating means by said operator.

53. The brake control system set forth in claim 48 wherein said means to disable said sway control means includes means responsive to actuation of said brake actuating means by said operator.

54. In a brake control system for use in an articulated vehicle system including a towing vehicle and a towed vehicle such as a trailer or the like of the type having a first nondriven wheel unit at one side of said towed vehicle and a second nondriven wheel unit at an opposite side of said towed vehicle, first brake means operatively associated with one wheel in said first unit, second brake means operatively associated with a second wheel in said second wheel unit, first means for generating a brake correction signal which varies as a function of wheel rotation of at least one wheel in at least one of said wheel units, brake regulation means operable in a first mode to reduce brake application at one wheel in each wheel unit as a function of said correction signal and thereby correct for a skid condition and operable in a second mode to increase brake application at said one wheel in each wheel unit as a function of said correction signal and thereby correct for a sway condition, and mode selection means operable to switch said regulating means from one operating mode to the other operating mode depending on whether said correction signal is to be interpreted as representing a skid condition or a sway condition.

55. In a brake control system for use in an articulated system including a towing vehicle and a towed vehicle such as a trailer or the like of the type having first and second nondriven wheel units disposed at respective opposite sides of said towed vehicle, each wheel unit having at least one wheel therein, first and second brake means operatively associated with at least one wheel in each wheel unit, respectively, and brake activating means adapted to be activated by an operator of a towing vehicle to apply said first and said second brake means, the combination comprising first and second means for generating respective first and second signals which vary proportionally to the angular velocity of at least one wheel in each of said wheel units, respectively, means for comparing said first and second signals to each other and providing a differential signal representing a difference between said first and second signals, and means operatively coupled to said brake activating means and responsive to said differential signal for simultaneously regulating brake application by said first and said second brake means at one wheel in each wheel unit proportionally to said differential signal such that a change in wheel speed differential between one wheel in one unit and one wheel in the other unit causes a corresponding change in brake regulation, and wherein said regulating means is adapted to correct for an impending skid and said regulating means further comprises brake driver means operative when said operator has caused application of said brake means and responsive to an increase in said differential signal to decrease brake application automatically at both said first and said second brake means proportionally to said differential signal to thereby correct for an impending skid condition, and wherein said regulating means further comprises locked wheel circuit means for overriding release of said brake means and said locked wheel circuit means comprises first detection circuit means responsive to said first and said second signals for providing a third signal when either one of said first and second signals is less than a first predetermined minimum level, and output means coupled to said brake driver means to cause said brake driver means to completely release said first and second brake means in response to said third signal so that if one or both of said wheel locks, said first and second brake means are completely released to correct for an impending skid, said locked wheel circuit means further comprises arming circuit means for disabling said locked wheel circuit means until said towed vehicle reaches a predetermined speed, said arming circuit means comprises second detection circuit means responsive to said first and and said second signals for providing a fourth signal when at least one of said first and second signals is less than said second predetermined minimum level, and means connected to said output means to disable said output means in response to said fourth signal so that said output means cannot cause said brake driver means to completely release said brake means until after said towed vehicle reaches said predetermined speed.

56. The combination set forth in claim 55 wherein said first predetermined minimum signal corresponds to a wheel speed on the order of nine miles per hour, and wherein said second predetermined minimum signal corresponds to a wheel speed on the order of ten miles per hour.

57. The method of correcting for skid of a towed vehicle while an operator of a towing vehicle is causing braking forces to be applied to at least one wheel in each of a pair of wheel units disposed relatively at opposite sides of said towed vehicle comprising the steps of sensing the angular velocity of at least one wheel in each wheel unit, comparing said angular velocities from each wheel unit to each other and simultaneously releasing said operator applied braking forces to at least one wheel in each unit proportionally to said velocity differential, and wherein said operator applied braking forces are released at a wheel in each wheel unit in linear proportion to said velocity differential.

58. In a brake control system for use in an articulated system including a towing vehicle and a towed vehicle such as a trailer or the like of the type having first and second nondriven wheel units disposed at respective opposite sides of said towed vehicle, each wheel unit having at least one wheel therein, first and second brake means operatively associated with at least one wheel in each wheel unit, respectively, and brake activating means adapted to be activated by an operator of a towing vehicle to apply said first and said second brake means, the combination comprising first and second means for generating respective first and second signals which vary proportionally to the angular velocity of at least one wheel in each of said wheel units, respectively, means for comparing said first and second signals to each other and providing a differential signal representing a difference between said first and second signals, and means operatively coupled to said brake activating means and responsive to said differential signal for simultaneously regulating brake application by said first and said second brake means at one wheel in each wheel unit proportionally to said differential signal such that a change in wheel speed differential between one wheel in one unit and one wheel in the other unit causes a corresponding change in brake regulation, and wherein said regulating means regulates brake application at both wheel units in linear proportion to said differential signal.

59. In a brake control system for use in an articulated system including a towing vehicle and a towed vehicle such as a trailer or the like of the type having first and second nondriven wheels disposed at respective opposite sides of said towed vehicle and brake means for applying brake torque at both of said wheels and including at least one electrically operated brake actuator, means for providing an electrical signal for operating said electrically operated brake actuator, said last-mentioned means including an electric brake controller adapted for actuation by the operator of said towing vehicle to vary said electrical signal and thereby vary brake actuation, and automatic brake regulation means to correct for an impending skid condition at said trailer comprising first means for generating a first signal which varies proportionally to the angular velocity of a first of said towed vehicle wheels, second means for generating a second signal which varies proportionally to the angular velocity of said second trailer wheel, means for comparing said first and said second signals to each other and providing a differential correction signal representing a difference between said first and said second signals, and output means including a controlled conduction device responsive to said differential signal and connected in series between said controller and said electrically operated brake actuator to decrease said electrical signal proportionally to said differential signal such that an increase in wheel speed differential between said first and second wheels causes a corresponding proportional decrease in brake actuation independent of said electric brake controller.

60. The combination set forth in claim 59 wherein said electrically operated brake actuator includes an actuating coil adapted to receive brake current via said controller and wherein said controlled conduction device comprises a pair of main current conducting electrodes and a control electrode for varying conduction through said main electrodes, said differential signal being applied to said control electrode and said main electrodes being connected in a series path for said electrical signal, said path including said controller, said coil and said main electrodes.

61. In a brake control system for use in an articulated system including a towing vehicle and a towed vehicle such as a trailer or the like of the type having first and second nondriven wheel units disposed at respective opposite sides of said towed vehicle, each wheel unit having at least one wheel therein, first and second brake means operatively associated with at least one wheel in each wheel unit, respectively, and brake activating means adapted to be activated by an operator of a towing vehicle to apply said first and said second brake means, the combination comprising first and second means for generating respective first and second signals which vary proportionally to the angular velocity of at least one wheel in each of said wheel units, respectively, means for comparing said first and second signals to each other and providing a differential signal representing a difference between said first and second signals, and means operatively coupled to said brake activating means and responsive to said differential signal for simultaneously regulating brake application by said first and said second brake means at one wheel in each wheel unit proportionally to said differential signal such that a change in wheel speed differential between one wheel in one unit and one wheel in the other unit causes a corresponding change in brake regulation.

62. In a brake control system for use in an articulated system including a towing vehicle and a towed vehicle such as a trailer or the like of the type having first and second nondriven wheel units disposed at respective opposite sides of said towed vehicle, each said wheel unit having at least one wheel therein, and brake means for applying brake torque at both of said wheel units and including at least one electrically operated brake actuator, means for providing an electrical signal for operating said electrically operated brake actuator, said last-mentioned means including an electric brake controller to vary said electrical signal and thereby vary brake actuation, and automatic brake regulation means to correct for an impending skid condition at said trailer comprising first means for generating a first signal which varies proportionally to the angular velocity of at least one wheel in at least a first of said towed vehicle wheel units, second means for generating a second signal which varies proportionally to the angular velocity of at least one wheel in said second trailer wheel unit, means for comparing said first and said second signals to each other and providing a differential correction signal representing a difference between said first and said second signals, and output means including a controlled conduction device responsive to said differential signal and connected in series with said controller and said electrically operated brake actuator to decrease said electrical signal proportionally to said differential signal such that an increase in wheel speed differential between said first and second wheel units causes a corresponding proportional decrease in brake actuation independent of said electric brake controller.

63. The combination set forth in claim 62 wherein said electrically operated brake actuator includes an actuating coil adapted to receive brake current from said controller, and wherein said controlled conduction device comprises a pair of main current conducting electrodes and a control electrode for varying conduction through said main electrodes, said differential signal being applied to said control electrode and said main electrodes being connected in a series path for said electrical signal, said path including said controller, said coil and said main electrodes.

64. The combination set forth in claim 63 wherein said brake means comprises electric brakes, said at least one electrically operated brake actuator comprising electromagnetic brake pucks at said at least one wheel in each said wheel units.

65. The combination set forth in claim 63 wherein said brake means comprises electrohydraulic brakes, said at least one electrically operated brake actuator comprising a coil-controlled metering valve disposed to feed hydraulic fluid pressure to said at least one wheel in each said wheel units.

66. The method of controlling braking of a towed vehicle of the type having a pair of wheel units disposed respectively at opposite sides of said towed vehicle, each unit having at least one wheel, comprising the steps of sensing wheel rotation of at least one wheel in a first of said wheel units, comparing said sensed wheel rotation with a reference to provide a control signal when said wheel rotation of said one wheel in said first unit deviates from said reference and simultaneously applying braking forces to at least one wheel in each of said wheel units in response to said control signal.

67. The method set forth in claim 66 wherein said control signal varies as a function of the difference between said reference and said sensed wheel rotation of said one wheel in said first wheel unit, and wherein said braking forces are applied proportionally to said differential control signal.

68. The method set forth in claim 67 for correcting a lateral sway condition of said towed vehicle wherein said reference is derived from wheel rotation of one wheel in the other wheel unit.

69. The method set forth in claim 67 for applying towed vehicle brakes when towing vehicle brakes are being applied by a towing vehicle operator wherein wheel rotation in said first wheel unit is sensed by sensing angular deceleration of said one wheel.

70. The method set forth in claim 69 wherein said step of sensing angular deceleration comprises the steps of sensing angular velocity of said one wheel and differentiating said sensed velocity signal.

71. The method set forth in claim 70 wherein said step of sensing angular deceleration comprises the further steps of sensing angular velocity of at least one wheel in said second wheel unit and selecting to be differentiated the faster of said sensed wheel velocities.

72. The method set forth in claim 69 wherein said reference signal is preselected as a function of the free rolling deceleration of said towed vehicle.

73. The method set forth in claim 72 wherein said reference is representative of a towed vehicle deceleration at about five feet per second per second.

74. The method set forth in claim 69 comprising the further step of enabling said step of applying brake forces only when brakes are being applied at said towing vehicle.

75. In a brake control system for use in an articulated vehicle system including a towing vehicle and a towed vehicle such as a trailer or the like of the type having first and second nondriven wheel units disposed at respective opposite sides of said towed vehicle, each wheel unit having at least one wheel therein, first and second brake means operatively associated with at least one wheel in each wheel unit, respectively, and brake activating means adapted to apply said first and said second brake means, the combination comprising sensing means including first means responsive to rotation of at least a first wheel in at least a first of said wheel units for generating a first electrical signal which varies as a function of rotation of said first wheel, means responsive to said first signal when said towing vehicle is being braked to provide a brake signal, and brake regulating means operatively coupled to said brake activating means and responsive to said brake signal to apply said first brake means at one wheel in said first brake unit and simultaneously apply said second brake means at one wheel in said second unit as a function of said brake signal.

76. The combination set forth in claim 75 wherein said first signal varies as a function of angular deceleration of said first wheel.

77. The combination set forth in claim 75 wherein said first means is responsive to angular velocity of said first wheel, and wherein said sensing means further includes means differentiating said angular velocity to provide said first signal.

78. The combination set forth in claim 77 wherein said sensing means further comprises second means responsive to angular velocity of at least a second wheel in a second of said wheel units and means selecting the faster angular velocity between said first and second wheels, said differentiating means being responsive to said faster angular velocity.

79. The combination set forth in claim 77 wherein said brake signal providing means comprises means providing a reference signal and means comparing said first signal to said reference signal to provide said brake signal as a function of the difference between said first and reference signals.

80. The combination set forth in claim 79 wherein said reference signal is a preselected function of the free rolling deceleration of said articulated vehicle system.

81. The combination set forth in claim 80 wherein said brake signal is proportional to said difference between said first and reference signals.

82. A brake control system for use in an articulated vehicle system including a towing vehicle and a towed vehicle such as a trailer or the like of the type having a first nondriven wheel unit at one side of said towed vehicle and a second nondriven wheel unit at an opposite side of said towed vehicle, first brake means operatively associated with one wheel in said first unit and second brake means operatively associated with a second wheel in said second wheel unit, said brake system comprising brake regulation means operable in a first mode to reduce brake application at one wheel in at least one wheel unit as a function of said correction signals and thereby correct for a skid condition and operable in a second mode to increase brake application at one wheel in at least one wheel unit as a function of said correction signals and thereby correct for a sway condition, first means for generating brake correction signals which vary as a function of trailer condition, and mode selection means operable to switch said regulating means from one operating mode to the other operating mode depending on whether said correction signals are to be interpreted as representing a skid condition or a sway condition.

83. The system set forth in claim 82 wherein said brake correction signals vary as a function of wheel rotation of at least one wheel in at least one of said wheel units.

84. In a brake control system for a vehicle adapted to be towed over a road surface and having at least first and second wheel units disposed on opposite sides of said vehicle and brake means disposed at each said wheel units for braking at least one wheel in each said wheel units, braking forces at said wheel units being respective functions of available coefficients of friction between each of said wheel units and a road surface, means responsive to angular velocity of at least one wheel in said first wheel unit to develop a first wheel speed signal, means responsive to angular velocity of at least one wheel in said second wheel unit to develop a second wheel speed signal, and means for controlling braking forces at said first and second wheel units substantially equally as a proportional function of said first and second wheel speed signals and at a uniform level consistent with the lowest coefficient of friction available between said first and second wheel units and a road surface.

85. The system set forth in claim 84 wherein said means for controlling braking forces reduces said braking forces at said first and second wheel units in proportion to the difference between said first and second wheel speed signals to the highest uniform level consistent with the lowest available coefficient of friction.

86. A method of correcting a skid condition as between first and second braked wheel units disposed on opposite sides of a towed vehicle and respectively in contact with surfaces having unequal first and second available coefficients of friction comprising the steps of sensing a difference in angular velocity between the braked wheel unit on the surface having the higher of said first and second available coefficients of friction and the wheel unit on the surface having the lower of said first and second available coefficients of friction, and reducing braking forces at both said wheel units substantially simultaneously in proportion to said difference to a highest uniform braking level at both said wheel units which is consistent with said lower available coefficient of friction.

* * * * *